US007372655B2

(12) United States Patent
Honjo et al.

(10) Patent No.: US 7,372,655 B2
(45) Date of Patent: May 13, 2008

(54) INFORMATION-PROCESSING APPARATUS, INFORMATION-PROCESSING METHOD, PROGRAMS AND RECORDING MEDIUMS

(75) Inventors: Ryoki Honjo, Kanagawa (JP); Tadashi Ozue, Kanagawa (JP); Takeshi Ichimura, Kanagawa (JP); Katsuya Arai, Kanagawa (JP); Katsuaki Ikema, Kanagawa (JP)

(73) Assignee: Sony Corporation (JP)

( * ) Notice: Subject to any disclaimer, the term of this patent is extended or adjusted under 35 U.S.C. 154(b) by 174 days.

(21) Appl. No.: 11/327,704

(22) Filed: Jan. 6, 2006

(65) Prior Publication Data
US 2006/0176602 A1 Aug. 10, 2006

(30) Foreign Application Priority Data
Jan. 6, 2005 (JP) ............................. 2005-001333

(51) Int. Cl.
*G11B 17/00* (2006.01)
(52) U.S. Cl. ...................................................... 360/69
(58) Field of Classification Search ................. 360/69, 360/46, 73.04, 60, 55
See application file for complete search history.

(56) References Cited

U.S. PATENT DOCUMENTS

| | | | | |
|---|---|---|---|---|
| 6,134,066 | A * | 10/2000 | Takayama et al. | 360/60 |
| 6,519,105 | B1 * | 2/2003 | Takayama | 360/55 |
| 6,535,344 | B1 * | 3/2003 | Takayama | 360/60 |
| 6,570,729 | B1 * | 5/2003 | Takayama | 360/69 |
| 6,580,576 | B1 * | 6/2003 | Takayama | 360/69 |
| 6,603,624 | B1 * | 8/2003 | Takayama | 360/69 |
| 6,603,626 | B1 * | 8/2003 | Takayama | 360/73.04 |
| 6,611,394 | B1 * | 8/2003 | Kato et al. | 360/69 |
| 6,614,610 | B1 * | 9/2003 | Takayama | 360/69 |
| 6,621,650 | B1 * | 9/2003 | Takayama | 360/69 |
| 6,624,959 | B1 * | 9/2003 | Takayama | 360/69 |
| 6,643,086 | B1 * | 11/2003 | Hiramoto et al. | 360/69 |
| 6,674,596 | B1 * | 1/2004 | Takayama | 360/69 |
| 6,701,060 | B2 * | 3/2004 | Yuen et al. | 386/46 |
| 6,711,343 | B1 * | 3/2004 | Matsumi et al. | 386/46 |
| 6,829,117 | B2 * | 12/2004 | Taki et al. | 360/69 |
| 6,970,317 | B2 * | 11/2005 | Kato et al. | 360/69 |
| 7,181,472 | B2 * | 2/2007 | Cameron et al. | 707/201 |
| 7,209,308 | B2 * | 4/2007 | Takayama | 360/69 |

FOREIGN PATENT DOCUMENTS

JP 09-134256 A 5/1997

* cited by examiner

*Primary Examiner*—Fred F. Tzeng
(74) *Attorney, Agent, or Firm*—Lerner, David, Littenberg, Krumholz & Mentlik, LLP

(57) ABSTRACT

Attributes of data recorded on a magnetic tape are stored in an attribute information table saved in an MIC (Memory in Cassette) of a tape cassette accommodated in a tape streamer drive connected to a host computer. The attributes are recorded for every identifier used for identifying a recording unit of the data. For each identifier, the attributes include the name of a file, a title, a file creation date/time, a file updating date/time, the amount of data contained in the file, the type of the data and a compression rate of the data. The attributes include not only those supplied by the host computer but also attributes generated after a data recording operation as information on the recording location of data. The attributes generated after the data recording operation include a group number and an offset from the beginning of the group identified by the group number. For example, the present invention can be applied to the tape streamer drive.

6 Claims, 15 Drawing Sheets

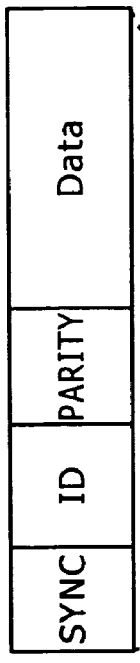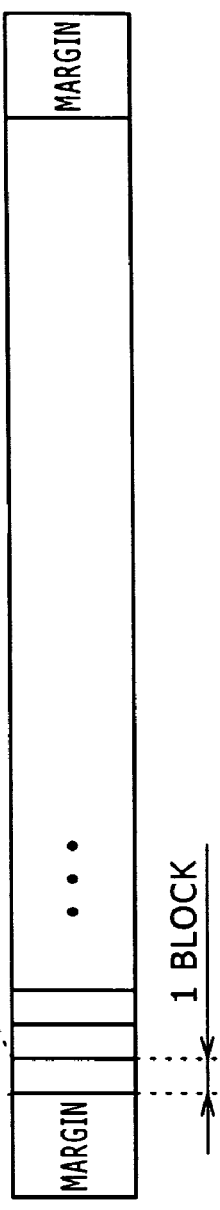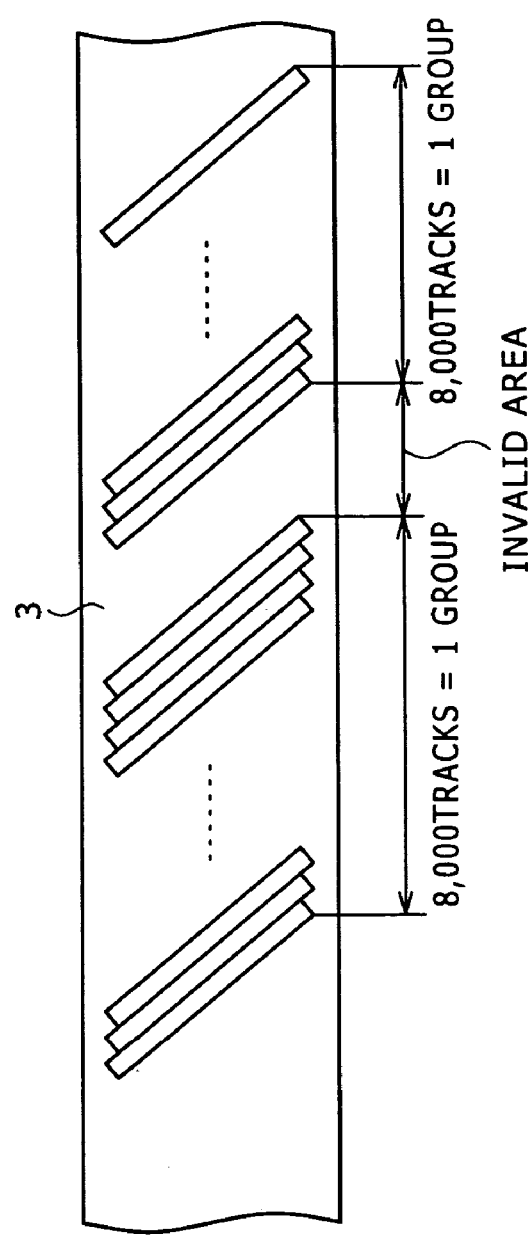
F I G. 3 A  F I G. 3 B  F I G. 3 C

FIG. 9

| IDENTIFIER | FILE NAME | FORMATION DATE | DATA SIZE | DATA TYPE | COMPRESSION RATE | ... | GROUP NUMBER | BYTE OFFSET FROM GROUP HEAD |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |
| | | | | | | | | |

FIG. 13A

| IDENTIFIER | FILE NAME |
|---|---|
| | |
| | |

FIG. 13B

| IDENTIFIER | FORMATION DATE | DATA SIZE |
|---|---|---|
| | | |
| | | |

FIG. 13C

| IDENTIFIER | FILE NAME | DATA TYPE |
|---|---|---|
| | | |
| | | |

INFORMATION-PROCESSING APPARATUS, INFORMATION-PROCESSING METHOD, PROGRAMS AND RECORDING MEDIUMS

CROSS-REFERENCE TO RELATED APPLICATIONS

The present application claims priority from Japanese Patent Application No. JP 2005-001333 filed on Jan. 6, 2005, the disclosure of which is hereby incorporated by reference herein.

BACKGROUND OF THE INVENTION

The present invention relates to information-processing apparatus, an information-processing method adopted by the information-processing apparatus, a program implementing the information-processing method and recording mediums for storing the program. More particularly, the present invention relates to information-processing apparatus properly used for recording data onto recording media for recording data sequentially as well as relates to an information-processing method adopted by the information-processing apparatus, a program implementing the information-processing method and recording mediums for storing the programs.

As the conventional data recording/reproduction apparatus capable of recording digital data onto a magnetic tape and reproducing digital data from the magnetic tape, a tape streamer drive is commonly known. A magnetic tape of a tape cassette mounted on the tape streamer drive as recording media can have a very large recording capacity of about several tens to several hundreds of GB (gigabytes). Thus, for example, such a tape cassette is widely used as a backup for data stored in a hard disk of a host computer or used in formation of an archive from video data having a large amount, moving-picture data having a large amount or the like. For more information, refer to Japanese Patent Laid-open No. Hei 9-134256, which is used in this specification as patent document 1.

In the tape streamer drive described in patent document 1, an SCSI (Small Computer System Interface) interface is used in data input and output operations. That is to say, in an operation to record data onto a magnetic tape of a tape cassette mounted on the tape streamer drive, data is transferred from a host computer in recording units each having a typical size of 32 Kbytes and supplied to the tape streamer drive by way of the SCSI interface. Then, the data supplied to the tape streamer drive is compressed and, if necessary, subjected to processing such as a buffering process, a modulation process and an RF amplification process before being supplied to a magnetic head for writing the data onto the magnetic tape. In an operation to read out data from the tape cassette, on the other hand, the data read out by the magnetic head is demodulated and, if necessary, subjected to processing such as a buffering process to be followed by a decompression process before being supplied to the host computer.

In addition, the tape cassette has a non-volatile memory referred to as an MIC (Memory in Cassette) for storing data received from a memory controller employed in the tape streamer drive. The memory controller employed in the tape streamer drive is also capable of reading out data from the non-volatile memory. In addition, an SCSI command can be used to exchange information between the host computer and the non-volatile memory. It is thus necessary to provide for example a serial data bus independent of the SCSI interface between the host computer and the non-volatile memory.

Various examples of the host computer using the tape steamer drive to create a backup of data or an archive include a mainframe computer and an ordinary personal computer.

Examples of a file format adopted in a process to record data onto a magnetic tape during the era of wide use of mainframe computers include a magnetic tape format with an attached ANSI (American National Standards Institute)/JIS label and a magnetic tape format with an attached IBM label. JIS-SX-0601, which is one of these magnetic tape formats, prescribes an operation to record data onto a magnetic tape by repetition of a label and a file main body. The file label includes a file name consisting of up to 17 characters. The format prescription also includes formation of a file and classification by record fixed length and record variable length.

The magnetic file formats include the formats of files, which cannot be recorded onto a magnetic tape without the need for the user to become accustomed to driving and/or control of the tape, that is, files unrecordable onto the magnetic tape as they are. Examples of such a file are an ISAM (Indexed Sequential Access Method) file and a VSAM (Virtual Storage Access Method) file. In data construction such as construction of fixed rows, the data of these formats cannot be recorded onto the magnetic file as it is.

Contemporary file formats widely used at the present time include a file format referred to as a sequential-file format, which allows data to be recorded onto a magnetic tape directly. In UNIX (a registered trademark), for example, the file system itself treats recording mediums such as a disk and a magnetic tape as a single byte stream without distinguishing the recording mediums from each other. For operations such as formation of data recorded on a magnetic tape in a file system, however, an application program such as a tar (tape archiver) is set.

In addition, in an interface between the conventional tape streamer drive and the host computer, a set of logical commands on an application layer is a command set obtained by correcting and extending a set of commands for making random accesses to an HDD or the like into a set of commands for the tape streamer drive. The application layer is not a physical or transport layer, which can be electrically connected to others. Instead, the application layer is a layer prescribing, among others, the set of logical commands.

Typical interfaces between the conventional personal computers and peripheral apparatus include the SCSI (Small Computer System Interface), ATA (AT Attachment) and ATAPI (ATA Packet Interface) The SCSI interface is used mainly as a system interface for connecting a peripheral apparatus conforming to ANSI (American National Standards Institute) specifications to a personal computer. Examples of the peripheral apparatus are an HDD (hard disk drive), an MO (Magneto Optical) drive and a CD-R drive, which are externally connected to the personal computer. The ATA interface is the formal specification name of an IDE (Integrated Drive Electronics) interface used mainly as an interface with an HDD, which conforms to the ANSI specifications as described above. The ATAPI interface is a packet interface devised as an interface for connecting an IDE controller to a device other than a hard disk. An example of the device other than a hard disk is a CD-ROM. In comparison with the IDE interface, the ATAPI interface improvement of the transfer speed, support for removable media, functions for portable PCs and others are prescribed in specifications. Since the ATAPI interface is capable of converting an SCSI command into an ATA command, by using the ATAPI interface, relatively with ease, it is possible to develop a CD-ROM drive, which does not require an expensive SCSI interface.

An extended command set for operations to record data onto a magnetic tape and reproduce data from the tape is defined for each of these interface specifications. By using these command sets, it is possible to treat data to be recorded onto the magnetic tape as a single data stream, issue commands to position a magnetic head and read out data or write data at the address of any block, the address of any byte, at any file mark or any set mark with the start position of the magnetic tape or the present position of the magnetic head taken as a reference.

That is to say, in the specifications of interfaces such as SCSI, ATA and ATAPI, which are mainly used as the conventional interfaces between a personal computer and peripheral apparatus, there is no concept of a data unit used as a file or a folder in the host computer. In addition, the tape streamer drive carries out an operation to record data onto a magnetic tape and read out data from the magnetic tape without having the concept of a data unit used as a file or a folder in the host computer.

The formats of a file of data to be recorded onto a magnetic tape are prescribed by an application program. Since the application program is executed in the host computer, the program is consciousness of a data unit used as a file or a folder in the host computer. The prescribed formats include a format prescribing tar (Tape Archiver) commands for typically Microsoft Windows (a trademark), an MTF (Microsoft Tape Format) prescribed by NT and a UNIX (a registered trademark) format. The tar commands do not have a compression function. However, the tar commands are commands for collecting a plurality of files into a single one or restoring data to an archived file and transmitting the single file.

While the tape streamer drive is characterized in that the magnetic tape accommodated therein can have a large storage capacity, the drive raises a problem that time it takes to position the magnetic head during recording and reproduction operations is long.

In the tape streamer drive, it may be impossible to know the substance of data recorded on the magnetic tape of a tape cassette mounted on the drive unless the identifier of a file recorded on the tape along the data is fetched. In many cases, an identifier is recorded at the beginning of each data recorded on the magnetic tape. For this reason, in order to read out desired data from a location on a magnetic tape employed in a tape cassette mounted on the tape streamer drive or record data onto a location on the tape, the user needs to make an access to the location by scanning data already recorded on the tape from the beginning of the tape. Thus, in comparison with, for example, an HDD allowing a random access to be made by virtue of a directory information area allocated to the file system, time it takes to make an access to desired data is long.

In order to solve the above problem raised in an access to a location on a magnetic tape employed in a tape cassette mounted on the tape streamer drive, the host computer holds a catalog in typically a backup utility included in Windows (a registered trademark) as a utility named NTBAKUP.EXE. The catalog is information such as indexes or a directory. By using the catalog, the host computer controls the tape streamer drive in operations to read out data from the magnetic tape and write data onto the tape. That is to say, the host computer holds file information of data recorded by the tape streamer drive on the magnetic tape.

Since the magnetic tape is a removable recording medium, it may be mounted on a host computer other than the host computer holding the file information. In this case, when the other host computer reads out data from the magnetic tape or writes data onto the tape, the computer needs to scan the magnetic tape in order to create the catalog. This is because the host computer does not hold a catalog. The larger the storage capacity of the magnetic tape, the longer the time it takes to scan the tape in order to create the catalog.

As described above, it is the host computer that controls operations carried out by the tape streamer drive. Thus, it is difficult to reduce the number of damages inflicted on the magnetic tape and shorten the access time by optimizing the operations of the tape streamer drive independently of processing carried out by the host computer.

In addition, in many cases, the tape streamer drive is used as means for creating a backup or archive of data on the magnetic tape. That is to say, in an operation to write data onto the magnetic tape in a backup or archive process, the data already exists as a complete file on a hard disk employed in the host computer. Thus, for example, attributes such as the name and size of the file have been determined. In an operation carried out by the conventional tape streamer drive to record data onto the magnetic tape or reproduce data from the tape, however, attributes such as the size of a file cannot be utilized in controlling the operation.

SUMMARY OF THE INVENTION

Addressing the problems described above, the inventors of the present invention have devised means for easily searching a recording medium used to sequentially record data for a desired location on the medium.

In accordance with an embodiment of the present invention, there is provided an information-processing apparatus for recording data on a recording medium used for sequentially recording data. The information-processing apparatus includes acquisition means for acquiring data to be recorded onto the recording medium and for acquiring an attribute of the data also to be recorded onto the recording medium; data recording means for recording the data in a first recording area of the recording medium; and attribute recording means for recording an attribute of the data in a second recording area of the recording medium different from the first recording area, the attribute being recorded in a table format associating the attribute with the data.

The information-processing apparatus may also include attribute generation means for generating a further attribute based on an attribute acquired by the acquisition means or based on a result of an operation carried out by the data recording means to record data on the recording medium. In this case, the attribute recording means may also record the further attribute onto the second recording area of the recording medium.

The acquisition means may acquire the data in predetermined recording units and acquire the attributes by associating the attributes with the data in the predetermined recording units. In this case, the attribute recording means may record the attributes in the table format which is composed of records each corresponding to one of the predetermined recording units.

The information-processing apparatus may also include identifier generation means for generating identifiers for distinguishing individual pieces of data recorded in the recording units from each other. In this case, the attribute recording means may record the attributes in the table format which is composed of records each corresponding to one of the predetermined recording units by associating the attributes in each record with one of the identifiers generated by the identifier generation means.

The information-processing apparatus may also include data supplying means for supplying data to another information-processing apparatus and the acquisition means may also be capable of acquiring data and an attribute of the data, which are to be recorded onto the recording medium, from the another information-processing apparatus. The data supplying means may also be capable of supplying an identifier generated by the identifier generation means to the another information-processing apparatus.

The recording medium can be a tape cassette that can be used for recording data on a magnetic tape.

The attribute recording means is capable of recording an attribute into a memory different from the magnetic tape employed in the tape cassette.

The recording medium can be a CD-R.

The information-processing apparatus may also include attribute reading means for reading out an attribute recorded by the attribute recording means.

The information-processing apparatus may also include reproduction-request acquisition means for receiving information to be used in a search process to search the recording medium for data from another information-processing apparatus and for receiving a request for reproduction of the data found in the search process from the another information-processing apparatus; search means for carrying out a search operation to search for a record associated with the data associated with an attribute read out by the attribute reading means as an attribute corresponding to the information received by the reproduction-request acquisition means; and reproduction means for reproducing the data associated with the record found in the search operation.

The information-processing apparatus may also include transmission-request acquisition means for receiving information to be used in a search process to search the recording medium for data from another information-processing apparatus and for receiving a request for transmission of the data found in the search process from the another information-processing apparatus; search means for carrying out a search operation to search for a record associated with the data associated with an attribute read out by the attribute reading means as an attribute corresponding to the information received by the reproduction-request acquisition means; and attribute-transmission control means for controlling transmission of the attribute corresponding to the record found in the search operation to the another information-processing apparatus.

The information-processing apparatus may also include transmission-request acquisition means for receiving information to be used in a search process to search the recording medium for data from another information-processing apparatus and for receiving a request for transmission of the data found in the search process from the another information-processing apparatus; search means for carrying out a search operation to search for a record associated with the data associated with an attribute read out by the attribute reading means as an attribute corresponding to the information received by the reproduction-request acquisition means; computation means for computing statistical information associated with the data by using the attribute included in the record found in the search operation; and statistical-information-transmission control means for controlling transmission of the statistical information to the another information-processing apparatus.

The information-processing apparatus may also include a plurality of temporary storage means for temporarily storing data acquired by the acquisition means; and storage control means for controlling an operation to temporarily store the data into the temporary storage means based on the attributes acquired by the acquisition means, wherein the storage control means is capable of reading out data from a specific one of the temporary storage means whenever the amount of the data is about to exceed the storage capacity of the specific one of the temporary storage means, and the data recording means records the data read out by the storage control means into the recording medium.

In accordance with another embodiment of the present invention, there is provided an information-processing method for recording data on a recording medium used for sequentially recording data. The information-processing method includes controlling a data acquisition operation to acquire data to be recorded onto the recording medium; controlling an attribute acquisition operation to acquire an attribute of the acquired data also to be recorded onto the recording medium; controlling a data recording operation to record the acquired data in a first recording area of the recording medium; and controlling an attribute recording operation to record an acquired attribute as the attribute of the acquired data in a second recording area of the recording medium different from the first recording area, the acquired attribute being recorded in a table format associating the acquired attribute with the acquired data.

In accordance with a further embodiment of the present invention, there is provided a recording medium recorded with a program to be executed by a computer to carry out a process of recording data on a recording medium used for sequentially recording data. The process includes controlling a data acquisition operation to acquire data to be recorded onto the recording medium; controlling an attribute acquisition operation to acquire an attribute of the acquired data also to be recorded onto the recording medium; controlling a data recording operation to record the acquired data in a first recording area of the recording medium; and controlling an attribute recording operation to record an acquired attribute as the attribute of the acquired data in a second recording area of the recording medium different from the first recording area, the acquired attribute being recorded in a table format associating the acquired attribute with the acquired data.

In accordance with the information-processing apparatus, the information-processing method and the program, which are provided by the present invention as described above, data to be recorded onto a recording medium and an attribute of the data are acquired, the acquired data is recorded in a first recording area of the recording medium and the attribute is recorded in a second recording area of the recording medium different from the first recording area, the attribute being recorded in a table format associating the attribute with the data.

In accordance with a still further embodiment of the present invention, there is provided a recording medium for recording data sequentially. The recording medium provided by the present invention includes a first recording area for recording the data; and a second recording area provided separately from the first recording area for recording attributes of the data in the first recording area in a table format associating the attributes with the data.

The recording medium provided by the present invention can be a tape cassette for accommodating a magnetic tape. In this case, the first recording area can be a recording area of the magnetic tape, whereas the second recording area can be a recording area of a memory provided separately from the magnetic tape.

The recording medium provided by the present invention can also be a CD-R.

In the recording medium provided by the present invention, data is recorded sequentially in the first recording area. In the second recording area different from the first recording area, on the other hand, attributes of the data recorded in the first recording area are recorded in a table format associating the attribute with the data.

In accordance with one of the embodiments of the present invention, data can be recorded sequentially in a first recording area of a recording medium and, in particular, attributes of the data can be recorded in a second recording area of the recording medium different from the first recording area. The attributes of the data can be recorded in a table format associating the attributes with the data. Thus, the recording medium can be searched with ease for a desired piece of data and for an attribute of the desired piece of data.

In accordance with another embodiment of the present invention, it is possible to provide a recording medium for recording data sequentially in a first recording area and for recording attributes of the data in a second recording area, the attributes of the data being recorded in a table format associating the attributes with the data. Since the first recording area of the recording medium is different and separated from the second recording area of the recording medium, an apparatus on which the recording medium has been mounted is capable of searching the recording medium with ease for desired data or for an attribute of the desired data. Examples of the apparatus are an information reproduction apparatus and an information-recording apparatus.

BRIEF DESCRIPTION OF THE DRAWINGS

These and other objects and features of the present invention will become clear from the following description of the preferred embodiments given with reference to the accompanying diagrams, in which:

FIGS. 3A to 3C are explanatory diagrams showing the structure of data recorded on a magnetic tape;

FIG. 9 is an explanatory diagram showing the structure of an attribute information table;

FIGS. 13A to 13C are explanatory diagrams showing responses to a query;

DETAILED DESCRIPTION

Figure 1:
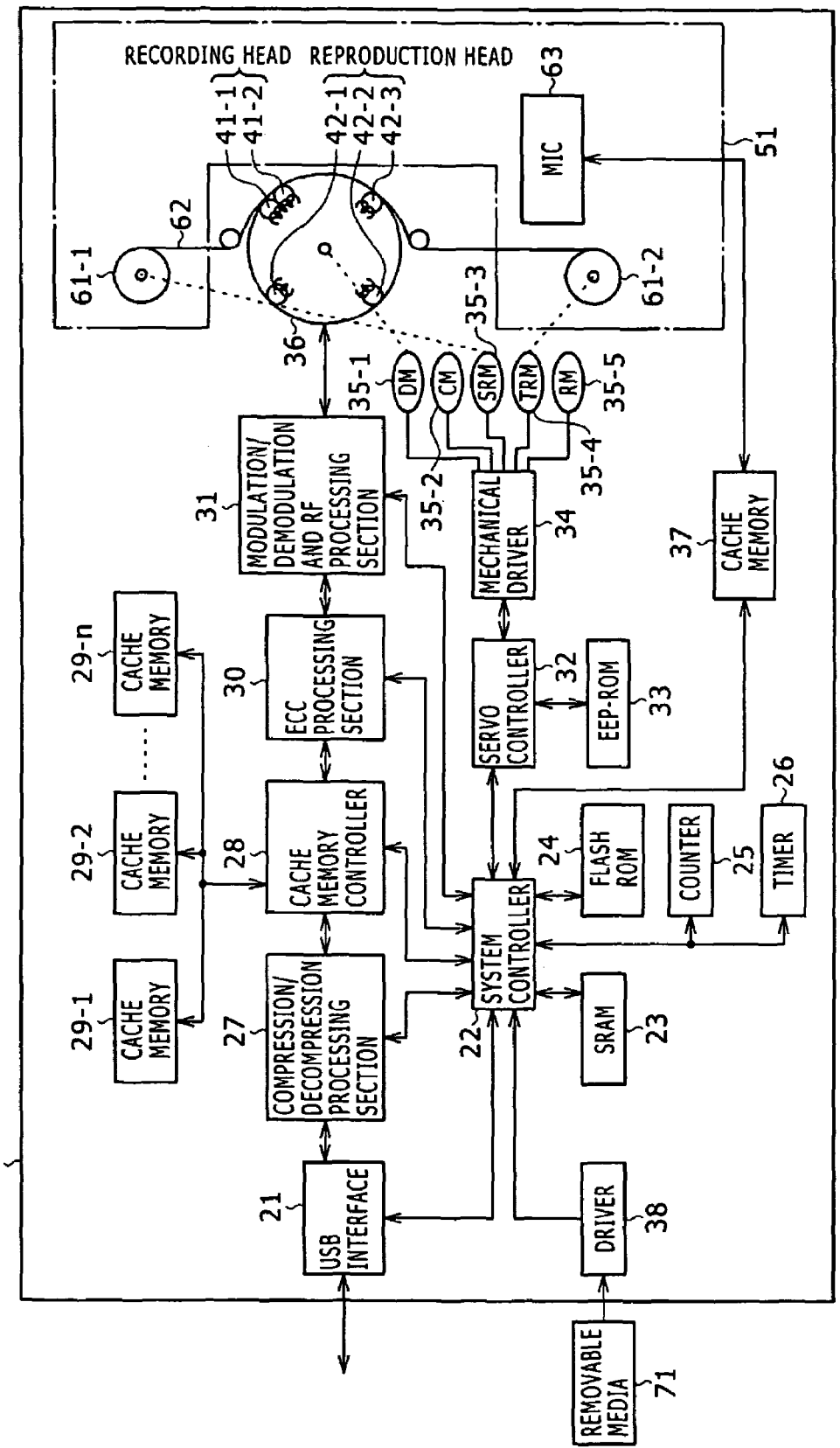
FIG. 1 is a block diagram showing the configuration of a tape streamer drive to which the present invention is applied.

Before preferred embodiments of the present invention are explained, relations between disclosed inventions and the embodiments are explained in the following comparative description. The following description merely makes an attempt to show that an implementation supporting an invention described in claims is explained as an embodiment of the present invention. It is to be noted that, even if there is an embodiment described in this specification but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

In accordance with an embodiment of the present invention, there is provided an information-processing apparatus (such as a tape streamer drive 1 shown in FIG. 1) for recording data on a recording medium (such as a magnetic tape or a CD-R) used for sequentially recording data. The information-processing apparatus is characterized in that the information-processing apparatus has:

an acquisition section (such as a USB interface 21 shown in FIG. 1) for acquiring data to be recorded onto the recording medium and acquiring an attribute of the data also to be recorded onto the recording medium;

a data recording section (such as a recording head 41 shown in FIG. 1) for recording data in a first recording area existing in the recording medium; and an attribute recording section (such as a table storage control section 123 shown in FIG. 2) for recording an attribute of data in a table format associating the attribute with the data in a second recording area existing in the recording medium as an area different from the first recording area used by the data recording section for recording the data.

The information-processing apparatus may also include an attribute generation section (such as an attribute generation section 122 shown in FIG. 2) for further generating an attribute on the basis of an attribute acquired by the acquisition section or on the basis of a result of an operation carried out by the data recording section to record data on the recording medium. In this case, the attribute recording section may also record the attribute generated by the attribute generation section onto the second recording area in the recording medium.

The acquisition section may acquire data in predetermined recording units (such as recording units each used as a data unit serving as a file in a host computer 201) and acquire attributes by associating the attributes with the data in aforementioned predetermined recording units. In this case, the attribute recording section may record attributes in the table format, which is composed of records each corresponding to one aforementioned predetermined recording unit.

The information-processing apparatus may also include an identifier generation section (such as an identifier generation section 103 shown in FIG. 2) for generating identifiers for distinguishing individual pieces of data recorded in aforementioned recording units from each other. In this case, the attribute recording section may record attributes in the table format, which is composed of records each corresponding to one aforementioned predetermined recording unit by associating attributes in each record with one of the identifiers generated by the identifier generation section.

The information-processing apparatus may also include a data supplying section (such as the USB interface 21 shown in FIG. 1) for supplying data to another information-processing apparatus and the acquisition section is also capable of acquiring data and an attribute of data, which are to be recorded onto the recording medium, from another information-processing apparatus. The data supplying section is also capable of supplying an identifier generated by the identifier generation section to another information-processing apparatus.

The recording medium can be a tape cassette (such as a tape cassette 51 shown in FIG. 1) that can be used for recording data on a magnetic tape (such as a magnetic tape 62 shown in FIG. 1).

The attribute recording section is capable of recording an attribute into a memory (such as a MIC 63 shown in FIG. 1) different from a magnetic tape employed in the tape cassette.

Figure 2:
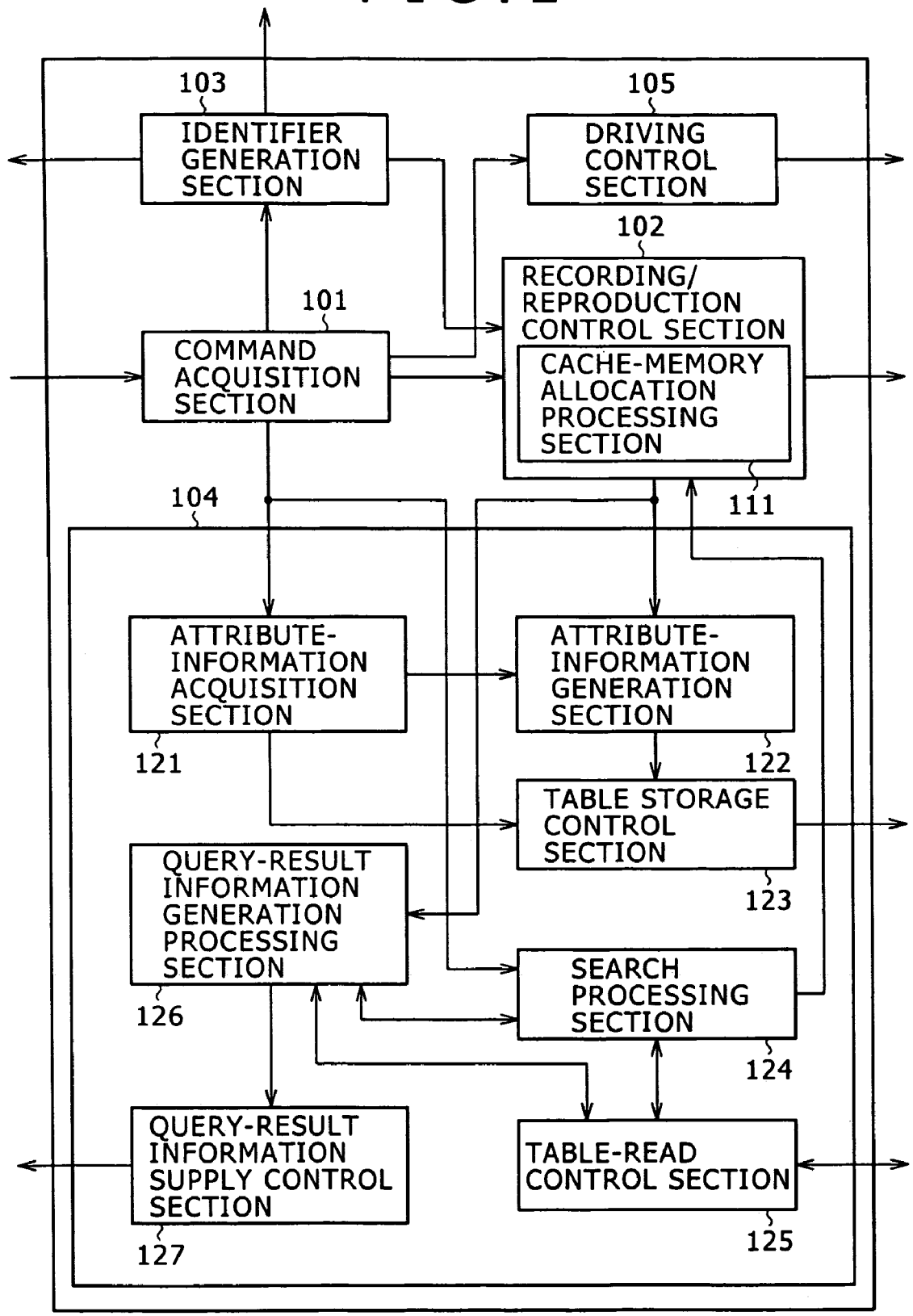
FIG. 2 is an explanatory functional block diagram showing functions that can be executed by the tape streamer drive.

The information-processing apparatus may also include an attribute reading section for reading out an attribute recorded by the attribute recording section (such as a table reading control section 125 shown in FIG. 2).

The information-processing apparatus may also include:
a reproduction-request acquisition section (such as a command acquisition section 101 shown in FIG. 2) for receiving information to be used in a search process to search the recording medium for data from another information-processing apparatus and receiving a request for reproduction of the data found in the search process from the other information-processing apparatus;

a search section (such as a search processing section 124 shown in FIG. 2) for carrying out a search operation to search for a record associated with the data associated with the attribute read out by the attribute reading section as an attribute corresponding to information received by the transmission-request acquisition section as the information to be used in the search process to search the recording medium for the data; and a reproduction section (such as a reproduction head 42 shown in FIG. 1) for reproducing the data associated with the record found in the search operation carried out by the search section.

The information-processing apparatus may also include:
a transmission-request acquisition section (such as a command acquisition section 101 shown in FIG. 2) for receiving information to be used in a search process to search the recording medium for data from another information-processing apparatus and receiving a request for transmission of the data found in the search process from the other information-processing apparatus;

a search section (such as the search processing section 124 shown in FIG. 2) for carrying out a search operation to search for a record associated with the data associated with the attribute read out by the attribute reading section as an attribute corresponding to information received by the transmission-request acquisition section as the information to be used in the search process to search the recording medium for the data; and an attribute-transmission control section (such as a query-result information supply control section 127 shown in FIG. 2) for controlling transmission of the attribute corresponding to the record found in the search operation carried out by the search section to the other information-processing apparatus.

The information-processing apparatus may also include:
a transmission-request acquisition section (such as a command acquisition section 101 shown in FIG. 2) for receiving information to be used in a search process to search the recording medium for data from another information-processing apparatus and receiving a request for transmission of the data found in the search process from the other information-processing apparatus;

a search section (such as the search processing section 124 shown in FIG. 2) for carrying out a search operation to search for a record associated with the data associated with the attribute read out by the attribute reading section as an attribute corresponding to information received by the transmission-request acquisition section as the information to be used in the search process to search the recording medium for the data;

a computation section (such as a query-result information generation processing section 126 shown in FIG. 2) for computing statistical information associated with the data by using the attribute included in the record found in the search operation carried out by the search section; and a statistical-information-transmission control section (such as a query-result information supply control section 127 shown in FIG. 2) for controlling transmission of the statistical information computed by the computation section to the other information-processing apparatus.

The information-processing apparatus may also include:
a plurality of data temporary storage sections (such as cache memories 29-1 to 29-n shown in FIG. 1) for temporarily storing data acquired by the acquisition section; and a storage control section (such as a cache memory controller 28 shown in FIG. 1) for controlling an operation to temporarily store data into the data temporary storage sections on the basis of attributes acquired by the acquisition section, wherein the storage control section is capable of reading out data from any specific one of the data temporary storage sections whenever the amount of the data is about to exceed the storage capacity of the specific data temporary storage section, and the data recording section records the data read out by the storage control section into the recording medium.

Figure 7:
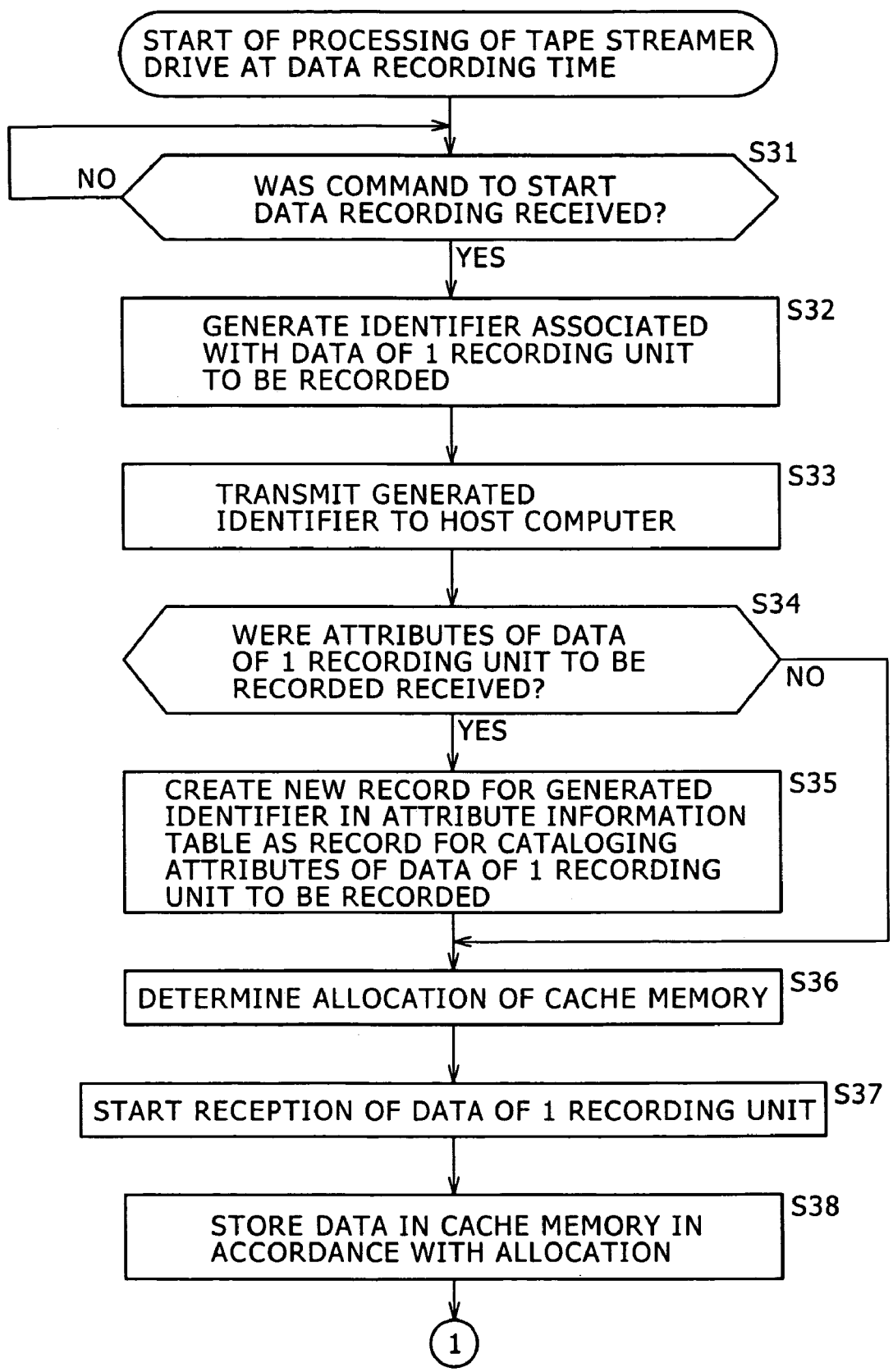
FIG. 7 shows a flowchart referred to in explanation of processing carried out by the tape streamer drive to record data onto a magnetic tape.
Figure 8:
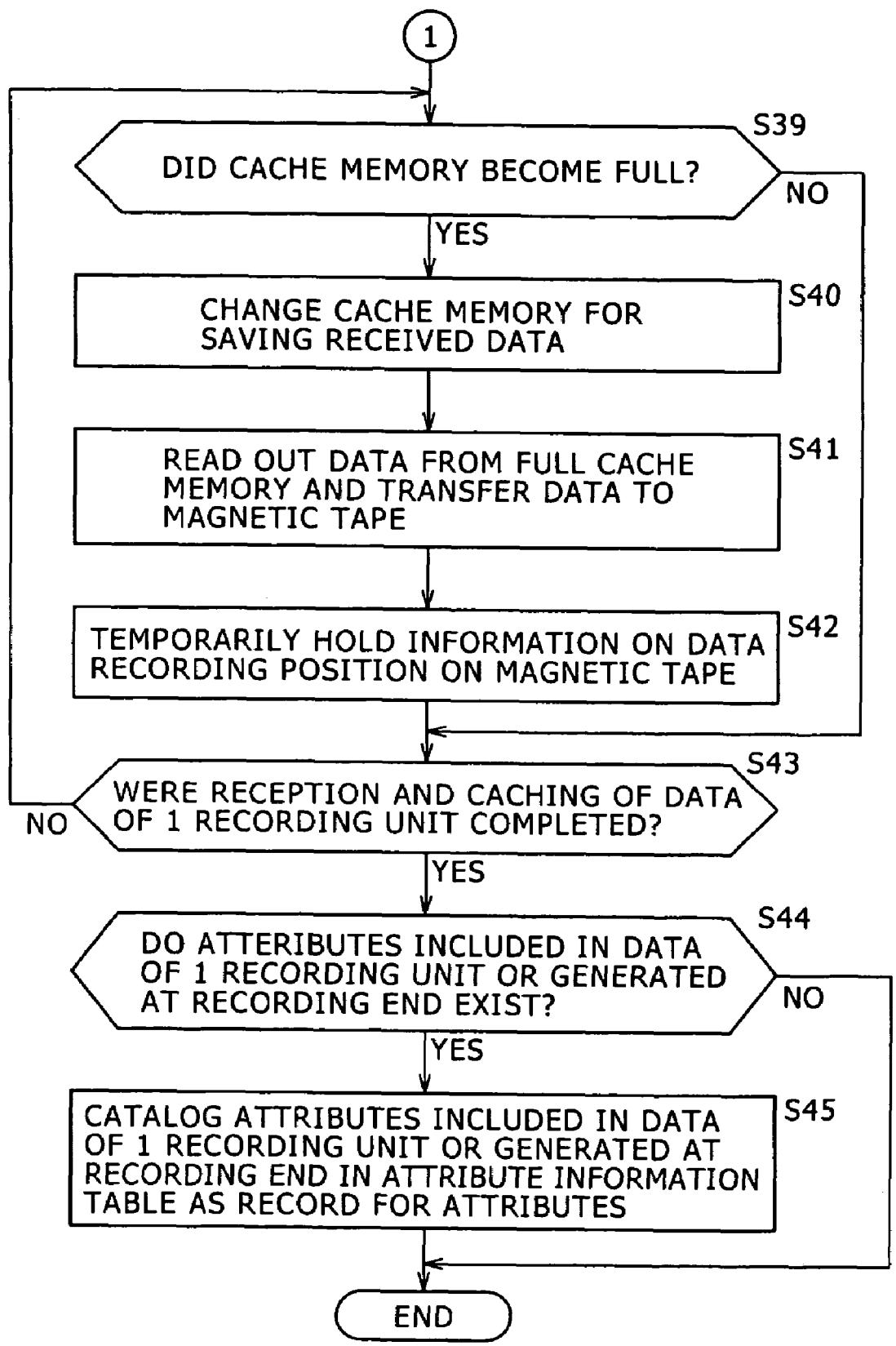
FIG. 8 shows a continuation of the flowchart referred to in explanation of the processing carried out by the tape streamer drive to record data onto the magnetic tape.

In accordance with another embodiment of the present invention, there is provided an information-processing method adopted by an information-processing apparatus (such as the tape streamer drive 1 shown in FIG. 1) for recording data on a recording medium (such as a magnetic tape or a CD-R) used for sequentially recording data. The information-processing method is characterized in that the information-processing method has:

a data acquisition control step (such as a process carried out at a step S37 of a flowchart shown in FIG. 7) of controlling a data acquisition operation to acquire data to be recorded onto the recording medium;

an attribute acquisition control step (such as a process carried out at a step S34 of the flowchart shown in FIG. 7) of controlling an attribute acquisition operation to acquire an attribute of the data to be recorded onto the recording medium;

a data recording control step (such as a process carried out at a step S41 of a flowchart shown in FIG. 8) of controlling a data recording operation to record data acquired in the data acquisition operation controlled in a process carried out at the data acquisition control step in a first recording area existing in the recording medium; and an attribute recording control step (such as processes carried out at a step S35 of the flowchart shown in FIG. 7 and a step S45 of the flowchart shown in FIG. 8) of controlling an attribute recording operation to record an attribute acquired in the attribute acquisition operation controlled in a process carried out at the attribute acquisition control step as the attribute of the data in a table format associating the attribute with the data in a second recording area existing in the recording medium as an area different from the first recording area used for recording the data in the data recording operation controlled in a process carried out at the data recording control step.

In addition, also in a program according to a further embodiment of the present invention, a typical embodiment of every step is identical with the typical configuration of the counterpart step in the information-processing method according to the other embodiment of the present invention.

In accordance with a still further embodiment of the present invention, there is provided a recording medium (such as a magnetic tape or a CD-R) for recording data sequentially. The recording medium provided by the present invention is characterized in that the recording medium has:

a first recording area (such as the built-in magnetic tape 62 shown in FIG. 1) for recording the data; and a second recording area (such as the MIC 63 shown in FIG. 1) provided separately from the first recording area as an area for recording attributes of the data in the first recording area in a table format associating the attributes with the data.

The recording medium provided by the present invention can be a tape cassette (such as a tape cassette 51 shown in FIG. 1) for accommodating a magnetic tape. In this case, the first recording area can be the recording area of the magnetic tape whereas the second recording area can be the recording area of a memory (such as the MIC 63 shown in FIG. 1) provided separately from the magnetic tape.

Embodiments of the present invention are explained by referring to diagrams as follows.

FIG. 1 is a block diagram showing the configuration of a tape streamer drive 1 to which the present invention is applied.

The tape streamer drive 1 receives data and a command from a host computer 201 to be described later by referring to FIG. 5. The data is recorded onto a magnetic tape 62 of a tape cassette 51 mounted on the tape streamer drive 1 while the command is an instruction for controlling the operation of the tape streamer drive 1. In addition, the tape streamer drive 1 also receives an attribute of the data to be recorded onto the magnetic tape 62 from the host computer 201. Moreover, the tape streamer drive 1 also receives information related to execution of the command. Examples of such information are a search condition and a search condition equation, which are to be used in reading out data already recorded on the magnetic tape 62. On the basis of the command and the information, data is recorded onto the magnetic tape 62 or reproduced from the magnetic tape 62.

To put it in detail, in the tape streamer drive 1, a USB interface 21 receives the data to be recorded onto the magnetic tape 62, the command, the various kinds of information related to execution of the command or other information from the host computer 201. The USB interface 21 supplies the data to a compression/decompression processing section 27 and the command or the various kinds of information to a system controller 22. On the other hand, the USB interface 21 receives data read out from the magnetic tape 62 from the compression/decompression processing section 27, and transmits the data to the host computer 201. The data has been subjected to various kinds of processing. In addition, the USB interface 21 also receives an ACK signal serving as response to the command from the system controller 22. The USB interface 21 also receives data representing a query response from the system controller 22. The USB interface 21 transmits the ACK signal and the query response to the host computer 201.

Data is exchanged between the host computer 201 and the tape streamer drive 1 on the basis of USB (Universal Serial Bus) specifications. Data treated in the host computer 201 typically as a file or as a content is handled in the tape streamer drive 1 as one recording unit to be recorded onto the magnetic tape 62 in one execution of a data recording command. That is to say, the host computer 201 issues a data recording command to the tape streamer drive 1 every time data of a recording unit needs to be recorded onto the magnetic tape 62. In addition, the host computer 201 also supplies attributes of each data of a recording unit to the tape streamer drive 1. Every time data of a recording unit needs to be reproduced from the magnetic tape 62, on the other hand, the host computer 201 gives a data reproduction command to the tape streamer drive 1.

The attributes of data of a recording unit include the name of a file containing the data of one recording unit, the title of the data, the type of the data, the amount of the data, information explaining the substance of the data, the name of the creator of the data or the name of the person holding the copyright of the data, the name of an application used in the creation of the data, the duration of reproduction of the data in case the data is a moving picture or a movie, specific information on the data in case the data is a moving picture, the reproduction mode of the data, the creation and updating dates/times of a file containing the data, the compression rate of the data, information on reliability of the data, an average transfer rate required in reproduction of the data, the frequency of accesses to the data and information added by the user to the file containing the data of one recording unit. The type of the data indicates that the data is a moving picture, a standstill picture, a text, audio data, video data or data of another type. In case the data is a content such as a television broadcasting program, the information explaining the substance of the data includes a broadcasting date/time, the name of a broadcasting station, the name of a television broadcasting program and performers appearing in the program. The specific information on a moving picture includes the frame rate, bit rate, sampling rate and Kordic type of the moving picture.

On the basis of commands issued by the host computer 201 to the system controller 22 by way of the USB interface 21, the system controller 22 controls the operation of the tape streamer drive 1.

To put it concretely, when the system controller 22 receives a command to start an operation to record data onto the magnetic tape 62 of the tape cassette 51 on the tape streamer drive 1 from the host computer 201 by way of the USB interface 21, the system controller 22 controls operations of components employed in the tape streamer drive 1 to record data received from the host computer 201 onto the magnetic tape 62, acquire or generate attributes of the data recorded on the magnetic tape 62 and catalog the attributes in an attribute information table stored in a MIC 63 to be described later. When the system controller 22 receives a command to carry out a process to search the magnetic tape 62 for desired data and a search condition or search condition equation required to carry out the search process from the host computer 201 by way of the USB interface 21, on the other hand, the system controller 22 carries out the search process by referring to the attribute information table stored in the MIC 63 and transmits a result of the search process to the host computer 201 by way of the USB interface 21.

In addition, when the system controller 22 receives a command to transmit estimated time it takes to access or read out predetermined data recorded on the magnetic tape 62 of the tape cassette 51 from the host computer 201 by way of the USB interface 21, the system controller 22 computes the estimated time it takes to access or read out the predetermined data and transmits a result of the computation to the host computer 201 by way of the USB interface 21. Furthermore, when the system controller 22 receives a command to read out predetermined data recorded on the magnetic tape 62 of the tape cassette 51 and information specifying the predetermined data from the host computer 201 by way of the USB interface 21, the system controller 22 controls operations of components employed in the tape streamer drive 1 to read out the predetermined data from the magnetic tape 62 by referring to the attribute information table stored in the MIC 63 and transmits the data to the host computer 201 by way of the USB interface 21.

An SRAM 23 and a flash ROM 24 are each connected to the system controller 22 as a memory for storing programs to be executed by the system controller 22 and storing data required in the execution of the programs. To put it concretely, the SRAM 23 is a work memory used for storing information including a variety of flags used in the programs to be executed by the system controller 22 as well as a work memory required in processing carried out by the system controller 22. On the other hand, the ROM 24 is a memory used for storing, among others, the programs to be executed by the system controller 22 and storing control constants and the like or information on the tape streamer drive 1. It is to be noted that the SRAM 23, the ROM 24 or both can also be provided as memories embedded in a microcomputer serving as the system controller 22. The information on the tape streamer drive 1 typically includes the name of a manufacturer producing the tape streamer drive 1, the serial number of the tape streamer drive 1, the manufacturing date of the tape streamer drive 1, the present temperature and the present quantity of the magnetic tape 62 wound around a take-up reel accommodated in the tape cassette 51 mounted on the tape streamer drive 1.

A counter 25 is a component for carrying out a counting process required for generation of an attribute to be cataloged in the attribute information table stored in the MIC 63 in a program executed by the system controller 22 in accordance with control performed by the system controller 22. A timer 26 is a component referred to by the system controller 22.

In an operation to record data received from the host computer 201 by way of the USB interface 21 onto the magnetic tape 62, on the basis of control executed by the system controller 22, the compression/decompression processing section 27 compresses the data by adoption of a predetermined compression method and supplies the compressed data to a cache memory controller 28 if necessary. Any compression method can be adopted. If a compression method based on LZ encoding is taken, for example, the compression/decompression processing section 27 assigns a special code to a character string processed in the past and stores the code by associating the code with the string of characters in the form of a dictionary. The compression/decompression processing section 27 compares a character string input thereafter with character strings already stored in the dictionary in order to compress the input string of characters into a code of an already stored character string matching the input string of characters. That is to say, every time an input string of characters does not match any of the character strings already stored in the dictionary, the input string of characters and a new code corresponding to the string of characters are cataloged in the dictionary. If the input string of characters matches any of the character strings already stored in the dictionary, the input string of characters is converged into a code of an already stored character string matching the input string of characters. The code is then output as a result of the process to compress the input string of characters.

In a process to supply data read out from the magnetic tape 62 to the host computer 201, on the other hand, the compression/decompression processing section 27 decompresses compressed data received from the cache memory controller 28 and supplies the decompressed data to the USB interface 21 under control executed by the system controller 22. In a process to decompress data compressed by adoption of the LZ encoding method, for example, the compression/decompression processing section 27 refers to the internal dictionary cited above to compare the compressed data with codes cataloged in the dictionary. Then, a precompression character string cataloged in the dictionary as a string corresponding to a code matching the compressed data is output as a result of the decompression process.

In an operation to record data received from the host computer 201 onto the magnetic tape 62, a cache memory controller 28 supplies data from the compression/decompression processing section 27 after being compressed by the compression/decompression processing section 27 to one selected among cache memories 29-1 to 29-$n$ each serving as a storage unit for caching data and fetches data from one selected among cache memories 29-1 to 29-$n$, supplying the fetched data to the ECC processing section 30 in accordance with control executed by the system controller 22. In an operation to supply data read out from the magnetic tape 62 to the host computer 201, on the other hand, the cache memory controller 28 supplies data received from the ECC processing section 30 to one selected among cache memories 29-1 to 29-$n$ in order to cache the data in the selected cache memory and fetches data from one selected among cache memories 29-1 to 29-n, supplying the fetched data to the compression/decompression processing section 27 in accordance with control executed by the system controller 22. The data received from the ECC processing section 30 is data already subjected to demodulation and error-correction processes.

As described above, the cache memories 29-1 to 29-n each serve as a storage unit for temporarily storing data in accordance with control executed by the cache memory controller 28. The storage capacity of each of the cache memories 29-1 to 29-n, that is, the amount of data which can be stored in each of the cache memories 29-1 to 29-n, corresponds to the size of one recording unit of data recorded on the magnetic tape 62. A structure of data recorded on the magnetic tape 62 will be described in detail later.

In the following description, each of the cache memories 29-1 to 29-n is referred to simply as a cache memory 29 in case it is not necessary to distinguish the cache memories 29-1 to 29-n from each other.

The cache memories 29-1 to 29-n can be constructed physically from a plurality of memories or from a physically single memory chip logically divided into a plurality of storage areas. It is to be noted that some of the storage areas of the cache memories 29-1 to 29-n can be used as a work memory in processing carried out by the cache memory controller 28 or the system controller 22.

In an operation to record data received from the host computer 201 onto the magnetic tape 62, in accordance with control executed by the system controller 22, the ECC processing section 30 adds an ECC (Error-Correcting Code) to compressed data output by the cache memory controller 28 before supplying the data to a modulation/demodulation and RF section 31. In an operation to supply data read out from the magnetic tape 62 to the host computer 201, on the other hand, the ECC processing section 30 carries out an error correction process on demodulated data, which is received from the modulation/demodulation and RF section 31, on the basis of the error-correction code in accordance with control executed by the system controller 22. To be more specific, if the data contains an error, the ECC processing section 30 detects and corrects the error. Then, the ECC processing section 30 supplies the data with any errors thereof corrected to the cache memory controller 28.

In an operation to record data received from the host computer 201 onto the magnetic tape 62, in accordance with control executed by the system controller 22, the modulation/demodulation and RF section 31 modulates the data including error-correcting codes in order to convert the data into an RF (Radio Frequency) signal, and carries out amplification as well as equalizing processes on the RF signal before supplying the RF signal to recording heads 41-1 and 41-2. In an operation to supply data read out from the magnetic tape 62 to the host computer 201, on the other hand, the modulation/demodulation and RF section 31 carries out a reproduction equalizing process on an RF signal supplied by the reproduction heads 42-1 to 42-3, demodulates a signal obtained as a result of the process and supplies the demodulated signal to the ECC processing section 30 in accordance with control executed by the system controller 22.

In accordance with control executed by the system controller 22, a servo controller 32 controls a mechanical driver 34 for driving a drum motor 35-1, a capstan motor 35-2, a supply reel motor 35-3, a take-up reel motor 35-4 and a loading motor 35-5. By controlling the mechanical driver 34, the rotations of the drum motor 35-1, the capstan motor 35-2, the supply reel motor 35-3, the take-up reel motor 35-4 and the loading motor 35-5 as well as their rotational speeds can be adjusted. It is thus possible to control a variety of operations. To be more specific, it is possible to control the traveling operations of the magnetic tape 62 in a normal data recording mode, a normal data reproduction mode, a fast feed mode and a fast rewind mode, control tape tension during a traveling operation of the magnetic tape 62 and control operations to mount and dismount the tape cassette 51 onto and from the tape streamer drive 1. The operations to mount and dismount the tape cassette 51 onto and from the tape streamer drive 1 are also referred to as loading and unloading operations respectively. To put it in detail, on the basis of information on the rotations of the drum motor 35-1, the capstan motor 35-2, the supply reel motor 35-3 and the take-up reel motor 35-4, the servo controller 32 detects errors between target rotational speeds set for the rotational operations of the drum motor 35-1, the capstan motor 35-2, the supply reel motor 35-3 and the take-up reel motor 35-4 and their actual rotational speeds. The information on a rotation is a signal generated by an FG (Frequency Generator), which is provided on each of the drum motor 35-1, the capstan motor 35-2, the supply reel motor 35-3 and the take-up reel motor 35-4. The information on a rotation is supplied to the servo controller 32 by way of the mechanical driver 34. Then, on the basis of the detected errors, the servo controller 32 controls the mechanical driver 34 to implement control of the rotational speeds of the drum motor 35-1, the capstan motor 35-2, the supply reel motor 35-3 and the take-up reel motor 35-4 in close loops.

The mechanical driver 34 is a driver for driving each of the drum motor 35-1, the capstan motor 35-2, the supply reel motor 35-3, the take-up reel motor 35-4 and the loading motor 35-5 into rotation in accordance with control executed by the servo controller 32. As described above, the mechanical driver 34 also provides the servo controller 32 with information generated by the FGs as information on the rotations of the drum motor 35-1, the capstan motor 35-2, the supply reel motor 35-3 and the take-up reel motor 35-4.

The drum motor 35-1 is a motor for driving a rotating drum 36 into rotation. The rotating drum 36 is a drum around which the magnetic tape 62 fed by a supply tape reel 61-1 of the tape cassette 51 mounted on the tape streamer drive 1 is wound. The capstan motor 35-2 is a motor for driving a capstan not shown in the figure into rotation. The capstan is a component for making the magnetic tape 62 travel at a constant speed. The supply reel motor 35-3 is a motor for driving the supply tape reel 61-1 of the tape cassette 51 on the tape streamer drive 1 into rotation. On the other hand, the take-up reel motor 35-4 is a motor for driving a take-up tape reel 61-2 of the tape cassette 51 on the tape streamer drive 1 into rotation. The loading motor 35-5 is a motor for driving a loading mechanism into rotation. The loading mechanism is component for loading and unloading the tape cassette 51 onto and from the tape streamer drive 1.

An EEP-ROM 33 is a memory for storing information required by the servo controller 32 to control motors such as the drum motor 35-1, the capstan motor 35-2, the supply reel motor 35-3, the take-up reel motor 35-4 and the loading motor 35-5. An example of such information is constants.

The recording heads 41-1 and 41-2 mentioned before as well as the aforementioned reproduction heads 42-1 to 42-3 are provided on the rotating drum 36. To put it concretely, the 2 recording heads 41-1 and 41-2 with azimuth angles different from each other are provided on the rotating drum 36 at positions separated from each other by a very small gap. On the other hand, the reproduction heads 42-1 to 42-3 each having a predetermined azimuth angle are provided on the rotating drum 36 at positions separated from each other by a predetermined angular gap. The recording heads 41-1 and 41-2 are each a head for recording data supplied by the modulation/demodulation and RF section 31 onto the magnetic tape 62. On the other hand, the reproduction heads 42-1 to 42-3 are each a head for reproducing data recorded on the magnetic tape 62 and supplying the reproduced data to the modulation/demodulation and RF section 31.

In the tape cassette 51, the supply reel motor 35-3 and the take-up reel motor 35-4 drive the supply tape reel 61-1 and the take-up tape reel 61-2 respectively into rotation as described above so as to make the magnetic tape 62 travel at a predetermined speed. The recording heads 41-1 and 41-2 record data onto the traveling magnetic tape 62. On the other hand, the reproduction heads 42-1 to 42-3 reproduce data from the traveling magnetic tape 62. The magnetic tape 62 fed by the supply tape reel 61-1 employed in the tape cassette 51 is wound around the rotating drum 36, which is driven into rotation by the drum motor 35-1, and passed on to the take-up tape reel 61-2. The magnetic tape 62 is driven to travel in a predetermined direction by the capstan cited above and a pinch roller, which are not shown in the figure. As described above, the capstan is driven into rotation by the capstan motor 35-2.

Data is recorded onto and reproduced from the magnetic tape 62 by adoption of a helical capstan method.

A MIC 63 is provided in the tape cassette 51. The MIC 63 is connected to a cache memory 37 so as to allow data to be exchanged between the system controller 22 and the MIC 63 by way of the cache memory 37. The MIC 63 is used for storing, among others, an attribute information table including attributes of data already recorded on the magnetic tape 62 employed in the tape cassette 51. The system controller 22 supplies information to the MIC 63 to be recorded in fields of the attribute information table. On the other hand, the system controller 22 is capable of reading out information from fields of the attribute information table. Details of the attribute information table will be explained later by referring to FIG. 9. In addition, the MIC 63 is also used for storing information on the tape cassette 51. The information on the tape cassette 51 includes the name of the manufacturer of the tape cassette 51, the number of operations carried out so far to load the tape cassette 51 into the tape streamer drive 1, the manufacturing date of the tape cassette 51, positions of bad spots on the magnetic tape 62 and the size of a storage area left in the magnetic tape 62.

The cache memory 37 is connected to the system controller 22 and the MIC 63 to serve as a temporary memory for caching data read out from the MIC 63 and data to be stored into the MIC 63.

The MIC 63 can be provided inside the tape cassette 51 as is the case with the conventional configuration. However, a predetermined portion of the recording area of the magnetic tape 62 can also be used as a substitute for the MIC 63. In this case, when the tape cassette 51 is mounted on the tape streamer drive 1, for example, the tape streamer drive 1 reads out the attribute information table from the predetermined portion included in the magnetic tape 62 as a substitute for the MIC 63 and temporarily stores the table in the cache memory 37. Thus, the system controller 22 is capable of referring to the attribute information table temporarily stored in the cache memory 37 in order to record data onto the magnetic tape 62 or reproduce data from the magnetic tape 62 and, if necessary, update the table. The attribute information table temporarily stored in the cache memory 37 and updated by the system controller 22 in operations to record data onto the magnetic tape 62 and reproduce data from the magnetic tape 62 can be stored back in the predetermined portion included in the magnetic tape 62 as a substitute for the MIC 63 before the tape cassette 51 is ejected from the tape streamer drive 1. In this way, in every operation carried out by the tape streamer drive 1 to record data onto the magnetic tape 62 or reproduce data from the magnetic tape 62, it is not necessary to scan data recorded on the magnetic tape 62 employed in the tape cassette 51. Instead, it is necessary to merely refer to the attribute information table stored in the recording area serving as the MIC 63 in order to control the operations to record data onto the magnetic tape 62 and reproduce data from the magnetic tape 62.

It is to be noted that the location to install the MIC 63 used for storing the attribute information table used for cataloging information on data recorded on the magnetic tape 62 employed in the tape cassette 51 is not limited to a location inside the tape cassette 51, but can also be any location in the tape streamer drive 1. Since the attribute information table must be created for every tape cassette 51 used as removable recording media, it is necessary to distinguish attribute information tables from each other if the attribute information table is stored in the MIC 63 provided inside the tape streamer drive 1. In this case, for every attribute information table, an ID unique to a table must be assigned to the table.

If necessary, a driver 38 is connected to the system controller 22. The driver 38 is a unit, on which a removable medium 71 is mounted so that data can be exchanged between the medium 71 and the tape streamer drive 1. Examples of the removable medium 71 are magnetic disks including a flexible disk, optical disks including a CD-ROM (Compact Disk—Read Only Memory) and a DVD, magneto-optical disks including an MD (Mini Disk, a trademark) as well as semiconductor memories.

In the tape streamer drive 1 shown in FIG. 1, a USB is used as an interface between the tape streamer drive 1 and the host computer 201. It is to be noted, however, that an interface other than the USB can also be used between the tape streamer drive 1 and the host computer 201. An example of the other interface is the SCSI. That is to say, by extending the functions of the transport layer and layers under the transport layer to adapt the functions to the interface between the tape streamer drive 1 according to the embodiment and the host computer 201 so as to allow processing operations to be carried out by the tape streamer drive 1 in conjunction with the host computer 201, the present invention can be applied to the tape streamer drive 1 without regard to the type of the interface. The processing operations are operations on the so-called application layer.

FIG. 2 is an explanatory functional block diagram showing functions that can be executed by the tape streamer drive 1. The functions that can be executed by the tape streamer drive 1 include functions implemented by hardware inside the tape streamer drive 1 and functions implemented by software programs executed by the system controller 22.

A command acquisition section 101 is a unit for receiving a command from the host computer 201 as well as various kinds of necessary information transmitted by the host computer 201 along with the command and supplying the command as well as the information to a recording/reproduction control section 102, an identifier generation section 103, a attribute acquisition section 121 or search processing section 124 employed in a table processing section 104 as well as a driving control section 105. The information transmitted by the host computer 201 includes attributes accompanying data to be recorded onto the magnetic tape 62 in a process to record the data onto the magnetic tape 62. In the case of a command to search for desired data or to read out desired data, on the other hand, the information transmitted by the host computer 201 includes a search condition or search condition equation required in the search or read process.

To put it concretely, if the command received from the host computer 201 is a command to start an operation to record data onto the magnetic tape 62, the command acquisition section 101 supplies the command to the recording/reproduction control section 102. The command acquisition section 101 also notifies the identifier generation section 103 that the command acquisition section 101 has received the command to start an operation to record data onto the magnetic tape 62. If the command acquisition section 101 also receives an attribute of data to be recorded onto the magnetic tape 62 along with the data, the command acquisition section 101 supplies the attribute to the attribute acquisition section 121 and a cache-memory allocation processing section 111 employed in the recording/reproduction control section 102.

If the command received from the host computer 201 is a command to search for desired data, the command acquisition section 101 supplies the command along with a search condition or a search condition equation to the search processing section 124. If the command received from the host computer 201 is a command to reproduce data from the magnetic tape 62, the command acquisition section 101 supplies the command to the recording/reproduction control section 102.

The recording/reproduction control section 102 is a unit for controlling operations carried out by the compression/decompression processing section 27, the cache memory controller 28, the ECC processing section 30 as well as the modulation/demodulation and RF section 31. To put it concretely, when a command to record data onto the magnetic tape 62 is received from the command acquisition section 101, for example, the recording/reproduction control section 102 drives the compression/decompression processing section 27, the cache memory controller 28, the ECC processing section 30 as well as the modulation/demodulation and RF section 31 in order to control the processing of the data supplied to the USB interface 21 as data to be recorded onto the magnetic tape 62. When a command to reproduce predetermined data from the magnetic tape 62 is received from the command acquisition section 101, on the other hand, the recording/reproduction control section 102 drives the compression/decompression processing section 27, the cache memory controller 28, the ECC processing section 30 as well as the modulation/demodulation and RF section 31 in order to control the reproduction of the data from the magnetic tape 62. In addition, the recording/reproduction control section 102 has a function of the cache-memory allocation processing section 111 to carry out a process to determine allocation of a data cache memory 29 which data is to be recorded onto or reproduced from. To be more specific, the recording/reproduction control section 102 has a function to select one of the data cache memories 29-1 to 29-n as a memory which data is to be recorded onto or reproduced from.

The cache-memory allocation processing section 111 is a unit for allocating cache memories 29 to data to be recorded onto the magnetic tape 62 on the basis of information such as the amount and type of the data. The cache-memory allocation processing section 111 is also a unit for determining cache memories 29 from which data is to be reproduced.

To put it concretely, in changing the allocation of the present cache memory 29 to data to be recorded onto the magnetic tape 62 in accordance with the amount of the data during an operation to record data onto the magnetic tape 62, for example, on the basis of attributes received from the command acquisition section 101 as the attributes of the data, the cache-memory allocation processing section 111 typically makes an attempt to collectively store pieces of data each having a small amount into one cache memory 29. By determining a cache memory 29 to be used as a cache for temporarily storing data to be recorded onto the magnetic tape 62 in accordance with the amount of the data in this way, data with a small amount can be recorded onto the magnetic tape 62 as a group of collected data. In changing the allocation of the present cache memory 29 to data to be recorded onto the magnetic tape 62 in accordance with the type of the data during an operation to record the data onto the magnetic tape 62, on the other hand, on the basis of attributes received from the command acquisition section 101 as the attributes of the data, the cache-memory allocation processing section 111 typically makes an attempt to store the data into a cache memory 29 selected typically in dependence on whether the data is a moving picture, a standstill picture, a text or data of another type. By selecting a cache memory 29 to be used as a cache for temporarily storing data to be recorded onto the magnetic tape 62 in accordance with the type of the data in this way, pieces of data of the same type can be recorded onto the magnetic tape 62 as a group of collected data.

By determining a cache memory 29 as described above, operations to record data onto the magnetic tape 62 and reproduce data from the magnetic tape 62 can be controlled on the basis of the attributes of the data.

When the command acquisition section 101 informs the identifier generation section 103 that a command to start an operation to record data onto the magnetic tape 62 has been received, the identifier generation section 103 issues an identifier unique to the data as an identifier used for identifying the data and supplies the identifier to the recording/reproduction control section 102 to be stored internally and the host computer 201. In actuality, the identifier is stored typically in the SRAM 23 shown in FIG. 1. The identifier can be a unique ID in the world. Examples of such an identifier are a GUID (Global Unique ID) and a UUID (Universal Unique Identifier). As an alternative, the identifier generation section 103 may generate a logically perfectly unique identifier as a unique random number typically by using a physical address stored in an internal ROM such as the ROM 24 shown in the FIG. 1 or other information stored in the ROM as the seed (or the source) of the random number. As another alternative to such a logically perfectly unique identifier, the identifier generation section 103 may also generate a random number practically having no problems by applying a hash function to information such as another random number or a system state and use the generated random number as the identifier. The random number practically having no problems is such a random number that the probability of the same random number's being generated with ease in another occasion is very low.

The table processing section 104 is a unit for controlling processes to record information into the attribute information table stored in the MIC 63 and update information already recorded in the table in an operation to record data onto the magnetic tape 62. The table processing section 104 also carries out a process to search the magnetic tape 62 for a specific piece of data satisfying a condition specified in a query about the piece of data. In carrying out the search process, the table processing section 104 reads out the attribute information table from the MIC 63 and, on the basis of the table, generates a result of the search process as a response to the query by selecting the specific piece of data among pieces of data already recorded on the magnetic tape 62.

The table processing section 104 has functions of an attribute acquisition section 121, an attribute generation section 122, a table storage control section 123, a search processing section 124, a table reading control section 125, a query-result information generation processing section 126 and a query-result information supply control section 127.

The attribute acquisition section 121 is a unit for receiving an attribute from the command acquisition section 101 and supplying the attribute to the attribute generation section 122 and the table storage control section 123. The attribute generation section 122 is a unit for generating another attribute on the basis of an attribute received from the attribute acquisition section 121, information obtained from the recording/reproduction control section 102 in a data recording operation as information on a data recording location and other information, and supplying the generated attribute to the table storage control section 123. In addition, since the recording/reproduction control section 102 also provides the attribute generation section 122 with an identifier generated by the identifier generation section 103 as an identifier identifying data of one recording unit, the attribute generation section 122 passes on this identifier to the table storage control section 123. In controlling a process to catalog a new attribute in a specific one of attribute information tables each stored in the MIC 63 as a table composed of records each provided for each recording unit of data recorded on the magnetic tape 62, the table storage control section 123 creates a new record including a field used for recording the new attributes received from the attribute acquisition section 121 and the attribute generation section 122, adding the new record to the specific attribute information table. As described above, an example of the recording unit is a file handled by the host computer 201. Typical fields of an attribute information table will be explained later by referring to FIG. 9.

The search processing section 124 is a unit for carrying a search process to search for data in accordance with a command received from the command acquisition section 101 as a command making a request for the search process and in accordance with either of a search condition and/or a search condition equation, which are also received from the command acquisition section 101, by controlling the table reading control section 125 to read out an attribute information table from the MIC 63. The search processing section 124 supplies information on records each included in the attribute information table as a record, which satisfies the search condition or the search condition equation, and statistical information to the query-result information generation processing section 126. The statistical information typically includes the number of pieces of data satisfying the search condition or the search condition equation and the total amount of such pieces of data. The table reading control section 125 is a unit for controlling an operation to read out an attribute information table from the MIC 63 in accordance with the control executed by the search processing section 124.

The query-result information generation processing section 126 is a unit for generating a response to a query received as a command to search for desired data on the basis of a search-process result received from the search processing section 124 as the aforementioned information on the records, which satisfy the search condition or the search condition equation, and supplying the response to the query to the query-result information supply control section 127. If the search-process result is a plurality of records satisfying the search condition or the search condition equation, the response to the query can have a table format or can be generated as a set composed of the records. As an alternative, the response to the query may also include only attributes matching the query. Examples of the attributes matching the query are the name of a file containing the desired data, the amount of the desired data, time it takes to make an access to the desired data and time it takes to transfer the desired data to the host computer 201 in case it is necessary to transfer the data thereto. Typical table formats will be described later by referring to FIGS. 13A to 13C as formats of the response to a query for a case in which the result of the search process includes a plurality of records satisfying the search condition or the search condition equation. The query-result information supply control section 127 is a unit for controlling a process of transmitting the query response generated by the query-result information generation processing section 126 to the host computer 201. To put it concretely, the query-result information supply control section 127 controls the process of transmitting the response to the query to the host computer 201 by way of the USB interface 21.

On the basis of a command received from the command acquisition section 101, the driving control section 105 controls the servo controller 32 to operate the mechanical driver 34, which in turn drives each of the drum motor 35-1, the capstan motor 35-2, the supply reel motor 35-3, the take-up reel motor 35-4 and the loading motor 35-5.

Next, data recording/reproduction operations carried out by the tape streamer drive 1 are explained.

When the USB interface 21 receives a command to start an operation to record data onto the magnetic tape 62 and an attribute of the data from the host computer 201, the USB interface 21 passes on the command and the attribute to the system controller 22.

At that time, the system controller 22 executes the following functions. The command acquisition section 101 informs the identifier generation section 103 that the command to start an operation to record data onto the magnetic tape 62 has been received. Notified of such a command, the identifier generation section 103 issues a peculiar identifier such as a GUID uniquely associated with the data to be newly recorded on the magnetic tape 62 and supplies the identifier to the recording/reproduction control section 102 to be stored in a memory. To be more specific, the identifier is stored in the SRAM 23. At the same time, the identifier generation section 103 controls a process to transmit the identifier to the host computer 201 by way of the USB interface 21. In addition, since the command acquisition section 101 supplies the command to start an operation to record received data onto the magnetic tape 62 to the recording/reproduction control section 102 and the driving control section 105, the recording/reproduction control section 102 controls the compression/decompression processing section 27, the cache memory controller 28, the ECC processing section 30 and the modulation/demodulation and RF section 31 to start the operation. On the other hand, the driving control section 105 controls the servo controller 32 to control the mechanical driver 34 to drive each of the drum motor 35-1, the capstan motor 35-2, the supply reel motor 35-3, the take-up reel motor 35-4 and the loading motor 35-5 into rotation.

In addition, when the command acquisition section 101 in the system controller 22 receives the command to start an operation to record data onto the magnetic tape 62 and the attribute of the data from the USB interface 21, if necessary, the cache-memory allocation processing section 111 employed in the recording/reproduction control section 102 determines allocation of a cache memory 29 as a temporary storage means to the data on the basis of the attribute. To be more specific, the cache-memory allocation processing section 111 typically determines the allocation of a cache memory 29 on the basis of the amount and type of the data. Moreover, when the command acquisition section 101 in the system controller 22 receives the command to start an operation to record data onto the magnetic tape 62 and the attribute of the data from the USB interface 21, the attribute acquisition section 121 employed in the table processing section 104 acquires the attribute from the command acquisition section 101.

Then, the USB interface 21 passes on data received from the host computer 201 as the data to be recorded onto the magnetic tape 62 to the compression/decompression processing section 27. Subsequently, in accordance with control executed by the system controller 22 or, in other words, in accordance with control executed by the recording/reproduction control section 102, the compression/decompression processing section 27 compresses the data by adoption of a predetermined compression method and supplies the compressed data to the cache memory controller 28. Then, in accordance with control executed by the system controller 22 or, in other words, in accordance with control executed by the cache-memory allocation processing section 111 employed in the recording/reproduction control section 102, the cache memory controller 28 passes on the compressed data to a selected one of the cache memories 29-1 to 29-n to be stored therein.

After the data of one recording unit received from the host computer 201 is stored in the selected one of the cache memories 29-1 to 29-n, the system controller 22 generates a record for the attribute of the data of the recording unit as a record to be added to an attribute information table stored in the MIC 63 employed in the tape cassette 51. The system controller 22 supplies the generated record to the MIC 63 to be stored therein by way of the cache memory 37 for temporarily storing the record before being supplied to the MIC 63.

To put it concretely, the attribute acquisition section 121 acquires the attribute supplied by the command acquisition section 101 and passes on the attribute to the attribute generation section 122 and the table storage control section 123. The attribute generation section 122 generates another attribute on the basis of the attribute received from the attribute acquisition section 121, information obtained from the recording/reproduction control section 102 in a data recording operation as information on a data recording location and other information, supplying the generated attribute to the table storage control section 123. In addition, since the recording/reproduction control section 102 also provides the attribute generation section 122 with an identifier generated by the identifier generation section 103 as an identifier used for identifying data of one recording unit, the attribute generation section 122 supplies also this identifier to the table storage control section 123. In controlling a process to catalog a new attribute in a specific one of attribute information tables each stored in the MIC 63 as a table composed of records each provided for each recording unit of data recorded on the magnetic tape 62, the table storage control section 123 creates a new record including a field used for recording the new attributes received from the attribute acquisition section 121 and the attribute generation section 122, adding the new record to the specific attribute information table. As described above, an example of the recording unit is a file handled by the host computer 201. Each attribute information table functions as a relational database and is typically described in the so-called SQL (Structured Query Language), which is a language provided for relational databases.

The MIC 63 is used for storing an attribute information table composed of records each showing attributes of data of one recording unit supplied by way of the cache memory 37 as a recording unit associated with an identifier.

When any specific one of the cache memories 29-1 to 29-n becomes full of data stored therein, the cache memory controller 28 reads out the data from the specific cache memory 29 and transfers the data to the ECC processing section 30. In addition, the cache memory controller 28 also reads out data left in any specific ones of the cache memories 29-1 to 29-n and transfers the data to the ECC processing section 30, for example, when a command to end the operation to record data onto the magnetic tape 62 is received, when the power supply of the tape streamer drive 1 is turned off or when no command is received during at least a predetermined period of time.

In accordance with control executed by the system controller 22 or, in other words, in accordance with control executed by the recording/reproduction control section 102, the ECC processing section 30 adds an error checking code such as a parity bit to every block of data received from the host computer 201 before supplying the data to the modulation/demodulation and RF processing section 31. Then, in accordance with control executed by the system controller 22 or, in other words, in accordance with control executed by the recording/reproduction control section 102, the modulation/demodulation and RF section 31 converts the input data into an RF signal and carries out amplification and equalizing processes on the RF signal before supplying a result of the amplification and equalizing processes to the recording heads 41-1 and 41-2.

In accordance with control executed by the system controller 22 or, in other words, in accordance with control executed by the driving control section 105, the servo controller 32 controls the mechanical driver 34 to drive each of the drum motor 35-1, the capstan motor 35-2, the supply reel motor 35-3, the take-up reel motor 35-4 and the loading motor 35-5 into rotation while referring to information stored in the EEP-ROM 33. The recording heads 41-1 and 41-2 record input data on the magnetic tape 62 employed in the tape cassette 51 by adoption of a helical capstan method.

The structure of data recorded on the magnetic tape 62 employed in the tape cassette 51 is explained by referring to FIGS. 3A to 3C and 4.

FIG. 3A is a diagram showing the data structure of each block unit including an additional ECC added to the block unit by the ECC processing section 30. As shown in the figure, a block includes a sync recording area, an ID area following the sync recording area, a parity area following the ID area and a data recording area following the parity area. The first sync recording area is an area used for recording a sync signal. The ID area is an area used for recording an ID used in a search process or the like. The parity area is an area for recording an ECC such as a parity bit for an error correction code of the ID recorded in the ID area. The first data recording area is an area used for recording data received from the host computer 201. As shown in FIG. 3B, a plurality of such blocks forms data of one track sandwiched by margin areas existing at both ends of the track.

Then, as shown in FIG. 3C, 8,000 tracks form one group. A gap with a predetermined width between adjacent groups serves as an ineffective area. In this way, data is recorded on the magnetic tape 62 as groups each including tracks, which each include blocks as described above. Each track is physically oriented in an inclined direction with respect to the transversal direction of the magnetic tape 62.

As shown in FIG. 3C, 8,000 tracks form one group of recorded data as described above. However, the amount of actual data recorded in every group is determined by the storage capacity of the cache memory 29. The actual data is data excluding aforementioned sync signals, aforementioned IDs and aforementioned ECCs. That is to say, the actual data is data recorded in the first data recording area shown in FIG. 3A. As described above, the operation to record data onto the magnetic tape 62 is carried out not in recording units. Instead, data received from the host computer 201 in recording units is temporarily stored in the cache memories 29-1 to 29-*n*. Then, pieces of data are transferred from the cache memories 29-1 to 29-*n* to the magnetic tape 62, starting with a piece of data stored in a full cache memory 29 after the data is subjected to predetermined processing. That is to say, the pieces of data are transferred from the cache memories 29-1 to 29-*n* to the magnetic tape 62 in group units, which are each a lump of data transferred at one time from a cache memory 29 to the magnetic tape 62. Since every block of data stored in each of the cache memories 29-1 to 29-*n* includes additional redundant information such as the ECC, the amount of the aforementioned actual data that can be stored in each cache memory 29 is merely a base amount, which is smaller than the storage capacity of the cache memory 29. In other words, the storage capacity of each cache memory 29 is typically about 1.5 times the amount of the actual data of a group having a size determined by consideration of redundancy and a rewrite rate, which become necessary due to a process to add an ECC to every block and a modulation process respectively. In addition, data is read out from the cache memory 29 in block units. Thus, data of each block read out from the magnetic tape 62 is subjected to demodulation and error-correction processes before being temporarily stored in one of the cache memories 29-1 to 29-*n*.

Figure 4:
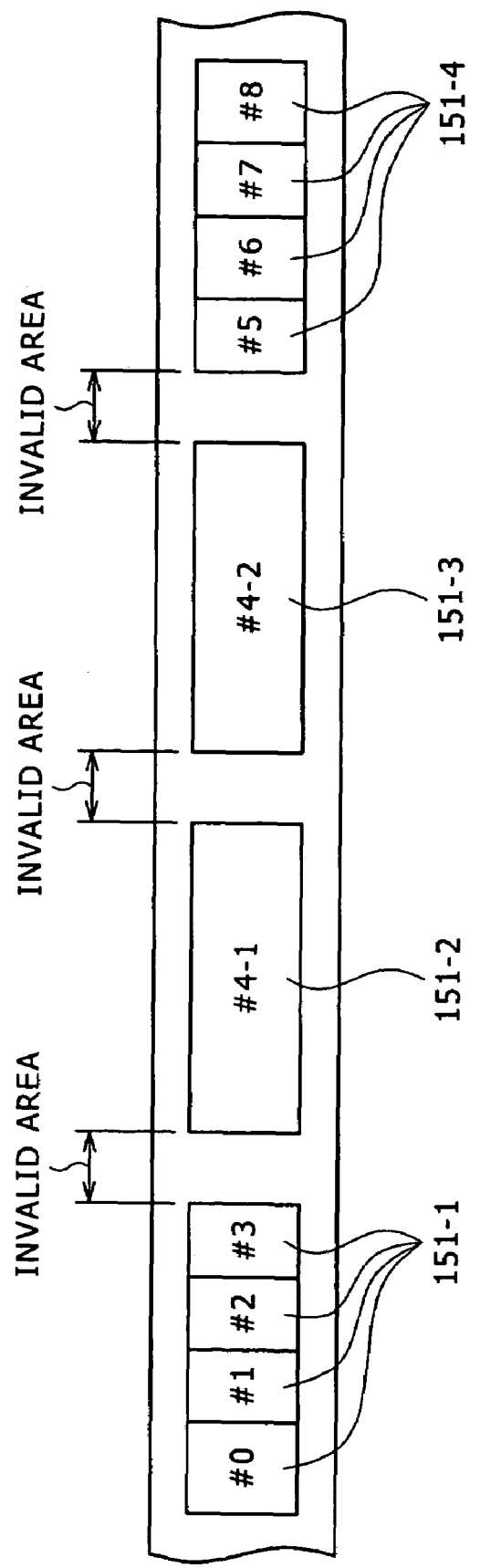
FIG. 4 is an explanatory diagram showing the structure of data recorded on a magnetic tape.

By referring to FIG. 4, the following description explains a relation between one recording unit and one group in data recorded onto the magnetic tape 62.

As described above, the operation to record data onto the magnetic tape 62 is carried out not in recording units. Instead, data received from the host computer 201 in recording units is temporarily stored in the cache memories 29-1 to 29-*n*. Then, pieces of data are transferred from the cache memories 29-1 to 29-*n* to the magnetic tape 62, starting with a piece of data stored in a full cache memory 29 after the data is subjected to predetermined processing. That is to say, the pieces of data are transferred from the cache memories 29-1 to 29-*n* to the magnetic tape 62 in group units, which are each a lump of data transferred at one time from a cache memory 29 to the magnetic tape 62. Thus, the group unit is different from the recording unit, which is a lump of data transferred from the host computer 201 to the tape streamer drive 1. For this reason, if the amount of data in one recording unit is smaller than one group unit, data of a plurality of recording units is recorded in a group as is the case with a group 151-1 containing data of recording units #0 to #3 and a group 151-4 containing data of recording units #5 to #8. If the amount of data in 1 recording unit is greater than one group unit, on the other hand, one recording unit is extended over a plurality of groups. For example, data #4-1 and data #4-2 composing a recording unit are recorded in groups 151-2 and 151-3 respectively.

Next, when the USB interface 21 receives a command to search for data and a search condition or a search condition equation of the data from the host computer 201, the USB interface 21 passes on the command and the search condition or the search condition equation to the system controller 22.

At that time, the system controller 22 executes the following functions. The command acquisition section 101 passes on the command to search for data and the search condition or search condition equation of the data to the search processing section 124. The search processing section 124 controls the table reading control section 125 to read out an attribute information table from the MIC 63. Then, the search processing section 124 extracts a record matching the search condition or the search condition equation from information stored in the attribute information table read out by the table reading control section 125 and supplies the extracted record to the query-result information generation processing section 126.

That is to say, the search processing section 124 is capable of searching the attribute information table, which is described in the so-called SQL (Structured Query Language) provided for a relational database system, for desired information.

The query-result information generation processing section 126 generates a result in response to a query made by the command to search for desired data on the basis information received from the search processing section 124 as the information on the record, which satisfies the search condition or the search condition equation, and supplies the result serving as the response to the query-result information supply control section 127. If the response to the query is a plurality of records satisfying the search condition or the search condition equation, the query result can have a table format or can be provided as a set composed of the records. As an alternative, the query result may also include only attributes matching the query. Finally, the query-result information supply control section 127 controls the process of transmitting the query result generated by the query-result information generation processing section 126 to the host computer 201.

Next, when the USB interface 21 receives a command to reproduce data from the magnetic tape 62 and information specifying the data to be reproduced, the USB interface 21 passes on the command and the information to the system controller 22.

At that time, the system controller 22 executes the following functions. The command acquisition section 101 passes on the command to reproduce data from the magnetic tape 62 and the information specifying the data to be reproduced from the magnetic tape 62 to the recording/ reproduction control section 102 and the driving control section 105. The driving control section 105 controls the servo controller 32 to control the mechanical driver 34 so as to drive each of the drum motor 35-1, the capstan motor 35-2, the supply reel motor 35-3, the take-up reel motor 35-4 and the loading motor 35-5 into rotation in order to reproduce the specified data from the magnetic tape 62. On the other hand, the recording/reproduction control section 102 controls processing to process the data read out from the magnetic tape 62 by controlling the modulation/demodulation and RF section 31, the ECC processing section 30, the cache memory controller 28 and the compression/decompression processing section 27.

In accordance with control executed by the system controller 22 or, in other words, in accordance with control executed by the driving control section 105, the servo controller 32 controls the mechanical driver 34 to drive each of the drum motor 35-1, the capstan motor 35-2, the supply reel motor 35-3, the take-up reel motor 35-4 and the loading motor 35-5 into rotation while referring to information stored in the EEP-ROM 33. While each of the drum motor 35-1, the capstan motor 35-2, the supply reel motor 35-3, the take-up reel motor 35-4 and the loading motor 35-5 is rotating, the reproduction heads 42-1 to 42-3 read out the data from the magnetic tape 62 employed in the tape cassette 51 and supply the data to modulation/demodulation and RF section 31 as an RF signal.

Then, in accordance with control executed by the system controller 22 or, in other words, in accordance with control executed by the recording/reproduction control section 102, the modulation/demodulation and RF section 31 carries out a reproduction equalizing process on the RF signal received from the reproduction heads 42-1 to 42-3, demodulates a signal obtained as a result of the reproduction equalizing process and supplies the demodulated signal to the ECC processing section 30. Subsequently, in accordance with control executed by the system controller 22 or, in other words, in accordance with control executed by the recording/reproduction control section 102, on the basis of error correction codes included in the demodulated data received from the modulation/demodulation and RF section 31, the ECC processing section 30 detects errors existing in the data, if any, corrects the errors and supplies the data with errors corrected to the cache memory controller 28.

Then, in accordance with control executed by the system controller 22 or, in other words, in accordance with control executed by the cache-memory allocation processing section 111 employed in the recording/reproduction control section 102, the cache memory controller 28 supplies the compressed data received from the ECC processing section 30 to one of the cache memories 29-1 to 29-$n$ and also reads out compressed data from a specific one of the cache memories 29-1 to 29-$n$, supplying the data read out from the specific cache memory 29 to the compression/decompression processing section 27.

Subsequently, in accordance with control executed by the system controller 22 or, in other words, in accordance with control executed by the recording/reproduction control section 102, the compression/decompression processing section 27 decompresses compressed data received from the cache memory controller 28 and supplies the decompressed data to the USB interface 21. Finally, the USB interface 21 passes on the data received from the compression/decompression processing section 27 as data read out from the magnetic tape 62 and subjected to a variety of processes to the host computer 201.

Next, when the USB interface 21 receives a query from the host computer 201, the USB interface 21 supplies a query command and information necessary for finding a response to the query to the system controller 22. An example of the query received from the host computer 201 is an inquiry about time it takes to make an access to desired data recorded on the magnetic tape 62 or about time it takes to acquire the desired data.

At that time, the system controller 22 executes the following functions. The command acquisition section 101 passes on the query command and the information necessary for finding a response to the query to the search processing section 124 and the recording/reproduction control section 102. The search processing section 124 controls the table reading control section 125 to read out an attribute information table from the MIC 63. Then, the search processing section 124 extracts the information necessary for finding a response to the query from the information recorded in the attribute information table read out by the table reading control section 125 and supplies the extracted necessary information to the query-result information generation processing section 126. The recording/reproduction control section 102 supplies information on states of a variety of components composing the tape streamer drive 1 to the query-result information generation processing section 126.

On the basis of pieces of information received from the search processing section 124 and the recording/reproduction control section 102, the query-result information generation processing section 126 generates a response to the query and supplies the query response to the query-result information supply control section 127. Then, the query-result information supply control section 127 controls a process to transmit the query response received from the query-result information generation processing section 126 to the host computer 201.

Figure 5:
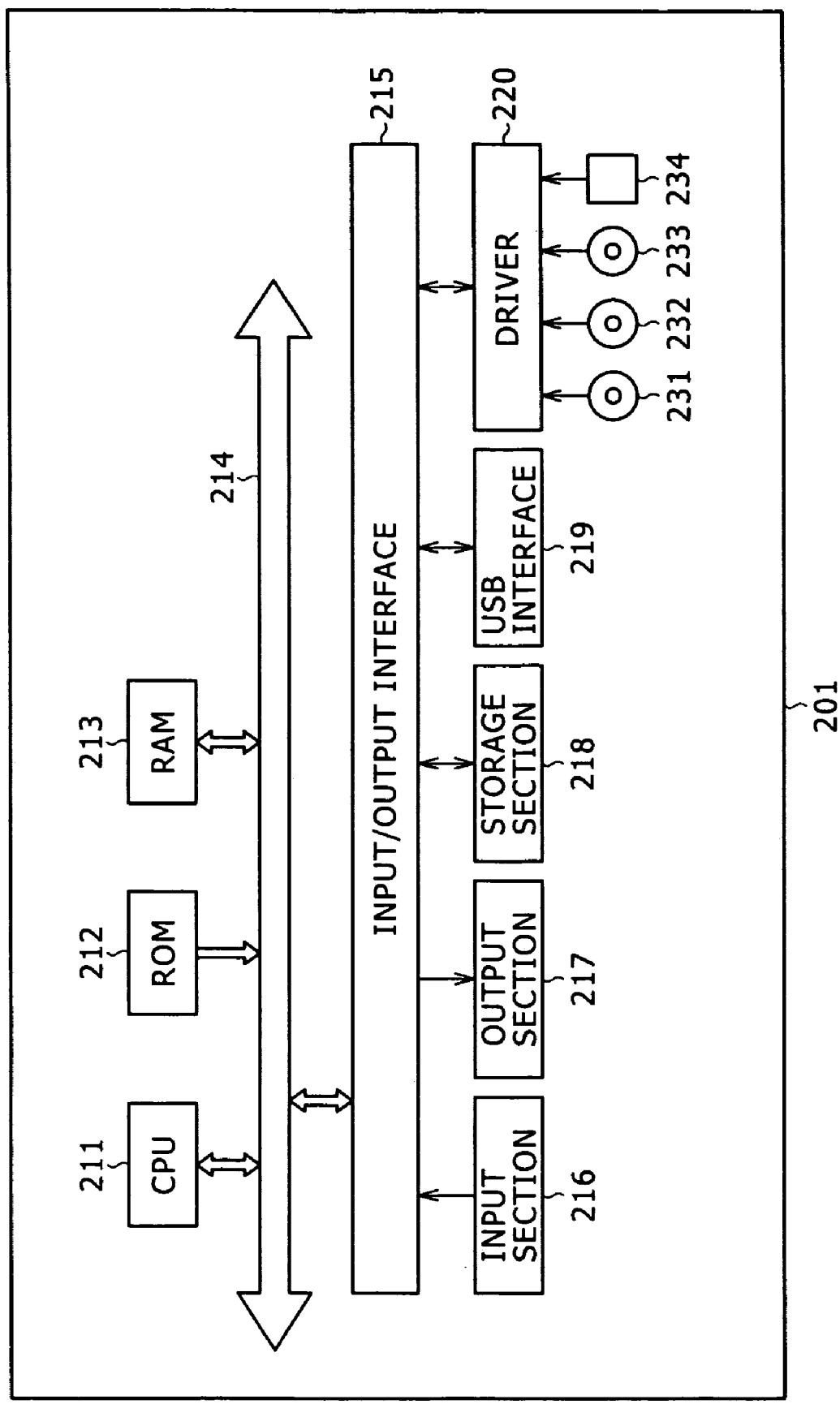
FIG. 5 is an explanatory block diagram showing the configuration of a host computer 201.

FIG. 5 is an explanatory block diagram showing the host computer 201 connected to the tape streamer drive 1 shown in FIG. 1.

A CPU (Central Processing Unit) 211 carries out various kinds of processing by execution of a program stored in advance in a ROM (Read Only Memory) 212 or a program loaded into a RAM (Random Access Memory) 213 from a storage section 218. The RAM 213 is also used for properly storing information such as data required by the CPU 211 in carrying out the processing.

The CPU 211, the ROM 212 and the RAM 213 are connected to each other by a bus 214. The bus 214 is also connected to an input/output interface 215.

The input/output interface 215 is connected to an input section 216, an output section 217, the storage section 218 cited above and a USB interface 219. The input section 216 includes a keyboard and a mouse whereas the output section 217 includes a display unit and a speaker. The storage section 218 includes a hard disk. The USB interface 219 is a unit for exchanging information with the tape streamer drive 1 shown in FIG. 1.

If necessary, the input/output interface 215 is also connected to a drive 220 on which a recording medium is mounted. The recording medium can be a magnetic disk 231, an optical disk 232, a magneto-optical disk 233 or a semiconductor memory 234. A computer program to be executed by the CPU 211 is read out from the recording medium and installed in the storage section 218 if necessary to be loaded into the RAM 213 for execution by the CPU 211 as described above.

To put it concretely, on the basis of operation inputs entered by the user from the input section 216 to the CPU 211 employed in the host computer 201 by way of the input/output interface 215 and the bus 214, the CPU 211 generates a variety of commands to be given to the tape streamer drive 1 and various kinds of information also to be given to the tape streamer drive 1 along with the commands. The commands and the information are transmitted to the tape streamer drive 1 by way of the bus 214, the input/output interface 215 and the USB interface 219.

When the user enters an operation input to select desired data stored in the storage section 218 and record the selected data onto the magnetic tape 62 employed in the tape cassette 51 mounted on the tape streamer drive 1 in a copy or transfer process, the CPU 211 generates a command to start an operation to record the selected data onto the magnetic tape 62 as well as attributes of the data, and transmits the command as well as the attributes to the tape streamer drive 1 by way of the bus 214, the input/output interface 215 and the USB interface 219. In a copy process, the data recorded onto the magnetic tape 62 remains in the storage section 218. In a transfer process, on the other hand, the data recorded onto the magnetic tape 62 no longer exists in the storage section 218. Then, the CPU 211 reads out the selected data from the storage section 218 and transmits the data to the tape streamer drive 1 by way of the bus 214, the input/output interface 215 and the USB interface 219.

Subsequently, the CPU 211 stores an identifier in the storage section 218 or the RAM 213 by associating the identifier with the data recorded onto the magnetic tape 62 or the attributes of the recorded data in case the identifier is received by the USB interface 219 from the tape streamer drive 1 as an identifier for identifying the data.

When the user enters an operation input to search the magnetic tape 62 employed in the tape cassette 51 mounted on the tape streamer drive 1 for desired data in a search process and enters a search condition or search condition equation for the search process, the CPU 211 generates a command to carry out the search process and transmits the command to the tape streamer drive 1 by way of the bus 214, the input/output interface 215 and the USB interface 219 along with the search condition or the search condition equation.

When the USB interface 219 receives information transmitted by the tape streamer drive 1 in response to a query made by a command transmitted from the host computer 201 to the tape streamer drive 1, the USB interface 219 passes on the information serving as the response to the query to the CPU 211 by way of the input/output interface 215 and the bus 214. Then, the CPU 211 generates display screen data for notifying the user of the response to the query and supplies the screen data to the output section 217 by way of the bus 214 and the input/output interface 215 as data for displaying a picture of the response on the display unit employed in the output section 217.

When the user enters an operation input specifying specific data already recorded on the magnetic tape 62 employed in the tape cassette 51 mounted on the tape streamer drive 1 and making a request for an operation to read out the specific data from the magnetic tape 62, the CPU 211 generates a command to read out the data from the magnetic tape 62 and transmits the command to the tape streamer drive 1 by way of the bus 214, the input/output interface 215 and the USB interface 219.

When the USB interface 219 receives the specific data from the tape streamer drive 1, the CPU 211 requests the USB interface 219 to pass on the received data to the storage section 218 to be stored therein. If necessary, the CPU 211 generates display screen data for the received data and supplies the screen data to the output section 217, which then displays the screen data on the display unit employed in the output section 217 while outputting sounds of the received data from the speaker also employed in the output section 217.

When the user enters an operation input as a query about time it takes to make an access to desired data recorded on the magnetic tape 62 employed in the tape cassette 51 mounted on the tape streamer drive 1 or about time it takes to acquire the desired data, the CPU 211 generates a command making the query and transmits the command along with information necessary for computation of a response to the query to the tape streamer drive 1 by way of the bus 214, the input/output interface 215 and the USB interface 219.

When the USB interface 219 receives information transmitted by the tape streamer drive 1 in response to a query made by a command transmitted from the host computer 201 to the tape streamer drive 1, the USB interface 219 passes on the information serving as the response to the query to the CPU 211 by way of the input/output interface 215 and the bus 214. Then, the CPU 211 generates display screen data for notifying the user of the response to the query and supplies the screen data to the output section 217 by way of the bus 214 and the input/output interface 215 as data for displaying a picture of the response on the display unit employed in the output section 217.

Figure 6:
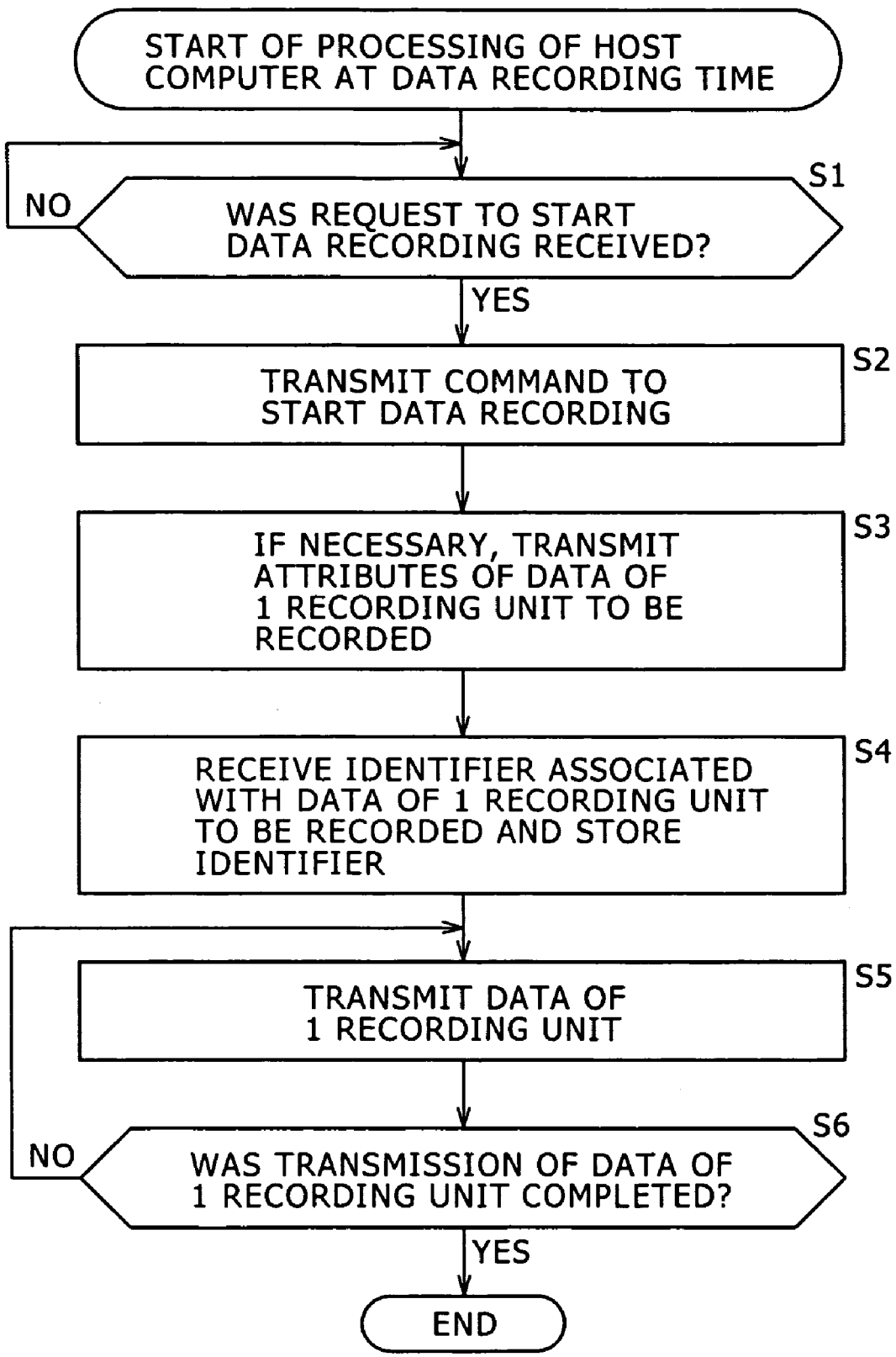
FIG. 6 shows a flowchart referred to in explanation of processing carried out by the host computer to record data onto a magnetic tape.

Next, processing carried out by the host computer 201 is explained by referring to a flowchart shown in FIG. 6.

The processing represented by the flowchart begins with a process carried out at a step S1. In the process carried out at this step, on the basis of a signal representing an operation input entered by the user from the input section 216 to the CPU 211 employed in the host computer 201 by way of the input/output interface 215 and the bus 214, the CPU 211 produces a result of determination as to whether or not a command to start an operation to record data onto the magnetic tape 62 has been received. If the determination result produced in the process carried out at the step S1 indicates that a command to start an operation to record data onto the magnetic tape 62 has not been received, the flow of the processing goes back to the step S1 at which the process of the step S1 is repeated. As a matter fact, the process of the step S1 is carried out repeatedly till the result of the determination indicates that a command to start an operation to record data onto the magnetic tape 62 has been received.

As the determination result produced in the process carried out at the step S1 indicates that a command to start an operation to record data onto the magnetic tape 62 has been received, the flow of the processing goes on to a step S2. In a process carried out at this step, the CPU 211 passes on the command to the USB interface 219 by way of the bus 214 and the input/output interface 215. Then, the USB interface 219 transmits the command to start an operation to record data onto the magnetic tape 62 to the tape streamer drive 1.

Subsequently, in a process carried out at the next step S3, on the basis of the data to be recorded onto the magnetic tape 62 in accordance with the data recording operation start command entered by the user in a process carried out at the step S1, the CPU 211 reads out attributes of data of one recording unit to be recorded onto the magnetic tape 62 from the storage section 218 and supplies the attributes to the USB interface 219 by way of the input/output interface 215. In the case of the host computer 201, a file is used as the recording unit. Thus, the attributes are attributes of data treated as a file in the host computer 201. Then, the USB interface 219 transmits the attributes of the data of one recording unit to the tape streamer drive 1.

The attributes of data of one recording unit may or may not include attributes, which cannot be transmitted to the tape streamer drive 1 in the process carried out at the step S3. Attributes that cannot be transmitted to the tape streamer drive 1 in the process carried out at the step S3 vary in dependence on, for example, the format of the data in the one recording unit and how the attributes are associated with the data. To put it concretely, if the attributes are merely multiplexed in the data or merely described in the data as a header, the process carried out at the step S3 to transmit the attributes to the tape streamer drive 1 is not a process easy to perform. Even in such a case, however, the CPU 211 is capable of carrying a process in advance to extract the attributes from the data and save the extracted attributes typically in the form of a file. By keeping the attributes in a file in this way, the attributes can be transmitted to the tape streamer drive 1 in the process carried out at the step S3 with ease.

In particular, the attributes transmitted to the tape streamer drive 1 in the process carried out at the step S3 as the attributes of data of one recording unit to be recorded onto the magnetic tape 62 may be information used in processing carried out by the tape streamer drive 1 as will be described later to allocate a cache memory 29 to the data. In this case, the attributes will be useful for the operation carried out by the tape streamer drive 1 to record the data onto the magnetic tape 62. Examples of the attributes used to allocate a cache memory 29 to the data are information showing the amount and type of the data.

Then, in a process carried out at the next step S4, the USB interface 219 receives an identifier associated with the data of the one recording unit to be recorded onto the magnetic tape 62 from the tape streamer drive 1. The tape streamer drive 1 transmits the identifier to the command acquisition section 101 at a step S33 of a flowchart representing processing to be described later by referring to FIG. 7. The CPU 211 supplies the received identifier to the storage section 218 or the RAM 213 to be stored in the storage section 218 or the RAM 213.

Then, in a process carried out at the next step S5, the CPU 211 reads out the data of the one recording unit to be recorded onto the magnetic tape 62 from the storage section 218 and transmits the data to the tape streamer drive 1 by way of the USB interface 219.

Subsequently, in a process carried out at the next step S6, the CPU 211 produces a result of determination as to whether or not the transmission of the data of the one recording unit has been completed. If the determination result produced in the process carried out at the step S6 indicates that the transmission of the data of the one recording unit has not been completed, the flow of the processing goes back to the step S5 at which the process of the step S5 is repeated. As a matter of fact, the processes of the steps S5 and S6 are carried out repeatedly till the transmission of the data of the one recording unit is completed. As the determination result produced in the process carried out at the step S6 indicates that the transmission of the data of the one recording unit has been completed, the execution of the processing is ended.

In the processing described above, the host computer 201 transmits a command to record data of one recording unit onto the magnetic tape 62 employed in the tape cassette 51 mounted on the tape streamer drive 1 to the tape streamer drive 1 along with attributes of the data if necessary, stores an identifier received from the tape streamer drive 1 as an identifier associated with the data in a memory employed in the host computer 201 and transmits the data to the tape streamer drive 1. An example of the recording unit is a file handled in the host computer 201.

By referring to a flowchart shown in FIGS. 7 and 8, the following description explains processing carried out by the tape streamer drive 1 concurrently with the processing explained above by referring to the flowchart shown in FIG. 6 to record data onto the magnetic tape 62.

It is to be noted that the processing represented by the flowchart shown in FIGS. 7 and 8 is explained on the basis of the functions shown in FIG. 2 as functions that can be executed by the tape streamer drive 1. That is to say, the processing represented by the flowchart shown in FIGS. 7 and 8 is processing that can be carried out by executing the functions implemented by the hardware inside the tape streamer drive 1 explained earlier by referring to FIG. 1 and the functions implemented by software programs executed by the system controller 22. For example, a process carried out by the command acquisition section 101 to acquire a command is a process carried out by the system controller 22 to acquire the command through the USB interface 21. Since association of such a functional block with a hardware block is self-apparent from FIGS. 1 and 2, the association is not described.

The processing represented by flowchart shown in FIGS. 7 and 8 begins with a process carried out by the command acquisition section 101 at a step S31 to produce a result of determination as to whether or not a command to start an operation to record data onto the magnetic tape 62 has been received from the host computer 201. The command to start an operation to record data onto the magnetic tape 62 is transmitted by the host computer 201 in the process carried out at the step S2 of the flowchart shown in FIG. 6. If the determination result produced in the process carried out at the step S31 indicates that a command to start an operation to record data onto the magnetic tape 62 has not been received from the host computer 201, the flow of the processing goes back to a step S31 at which the process of the step S31 is repeated. As a matter fact, the process of the step S31 is carried out repeatedly till the result of the determination indicates that a command to start an operation to record data onto the magnetic tape 62 has been received from the host computer 201.

As the determination result produced in the process carried out at the step S31 indicates that a command to start an operation to record data onto the magnetic tape 62 has been received from the host computer 201, the flow of the processing goes on to a step S32. In a process carried out at the step S32, the command acquisition section 101 notifies the identifier generation section 103 that a command to start an operation to record data onto the magnetic tape 62 has been received from the host computer 201. Notified of reception of such a command, the identifier generation section 103 generates an identifier associated with the data.

Then, in a process carried out at the next step S33, the identifier generation section 103 transmits the generated identifier to the host computer 201 and supplies the identifier to the recording/reproduction control section 102. The recording/reproduction control section 102 then passes on the identifier to the attribute generation section 122.

Subsequently, in a process carried out at the next step S34, the command acquisition section 101 produces a result of determination as to whether or not attributes of the data of the one recording unit to be recorded onto the magnetic tape 62 have been received from the host computer 201.

If the determination result produced in the process carried out at the step S34 indicates that attributes of the data of the one recording unit to be recorded onto the magnetic tape 62 have been received from the host computer 201, the flow of the processing goes on to a step S35. In a process carried out at the step S35, the command acquisition section 101 passes on the attributes to the attribute acquisition section 121. In turn, the attribute acquisition section 121 passes on the attributes to the attribute generation section 122 and the table storage control section 123. The attribute generation section 122 creates other attributes from the attributes received from the attribute acquisition section 121 and supplies the other attributes to the table storage control section 123 along with the identifier, which has been received from the recording/reproduction control section 102 in the process carried out at the step S33. Receiving the attributes of the data of the one recording unit to be recorded onto the magnetic tape 62 from the attribute generation section 122 and the attribute acquisition section 121, the table storage control section 123 creates a new record associated with the identifier as a record including a field used for recording the attributes and adds the new record to an attribute information table like one shown in FIG. 9. To put it concretely, the attribute information table is read out from the MIC 63 employed in the tape cassette 51, being stored temporarily in the cache memory 37, and the new record including a field used for recording the attributes of the data of the one recording unit to be recorded onto the magnetic tape 62 is added to the attribute information table. The attribute information table stored temporarily in the cache memory 37 is returned to the MIC 63 for example when the tape streamer drive 1 receives a command to eject the tape cassette 51 out off the tape streamer drive 1 from the host computer 201.

The attribute information table shown in FIG. 9 includes attributes for each identifier for distinguishing data of a recording unit or a file from data of another recording unit or another file. The attributes include the name of a file containing the data of one recording unit, the title of the data, the creation date/time of the file, the updating date/time of the file, the amount of the data contained in the file, the type of the data, the compression rate of the data, information on the substance of the data, the name of the creator of the data or the name of the holder of the copyright of the data, the name of an application used in creation of the data, the reproduction duration of the data in case the data is a moving picture or a movie, the frame rate of the data in case the data is a moving picture, the bit rate of the data in case the data is a moving picture, the sampling rate of the data in case the data is a moving picture, information on a Kordic type, information on the reproduction mode of the data, reliability information such as an error rate of the data, a data average transfer rate required for reproduction, the frequency of accesses to the data, information added by the user to the file (or data of one recording unit), a group number and an offset from the beginning of the group indicated by the group number. For example, the type of the data contained in the file may indicate that the data is a moving picture, a standstill picture, a text, audio data or video data. The information on the substance of the data is the so-called metadata. In the case of data of a content such as a television broadcast program, for example, the information on the substance of the data includes a broadcasting date/time, the name of the broadcasting station, the name of the television broadcast program and performers appearing in the television broadcast program. The information added by the user to the file (or data of one recording unit) is treated as an attribute if the information is cataloged as an attribute transmitted by the host computer 201 in the attribute information table. The group number is information generated after the operation to record data onto the magnetic tape 62 is ended as information showing a location at which the data has been recorded.

If the determination result produced in the process carried out at the step S34 indicates that attributes of the data of the 1 recording unit to be recorded onto the magnetic tape 62 have not been received from the host computer 201, on the other hand, the flow of the processing goes on to a step S36. The flow of the processing also goes on to a step S36 after the process carried out at the step S35 is completed. In a process carried out at the step S36, the cache-memory allocation processing section 111 employed in the recording/reproduction control section 102 determines allocation of a cache memory 29 to data to be temporarily stored therein.

To put it concretely, if the determination result produced in the process carried out at the step S34 indicates that attributes of the data of the one recording unit to be recorded onto the magnetic tape 62 have been received from the host computer 201, the cache-memory allocation processing section 111 determines allocation of a cache memory 29 to data to be temporarily stored therein. To put it even more concretely, if the present cache memory 29 must be changed in accordance with the amount of data to be cached, the cache-memory allocation processing section 111 typically makes an attempt to collectively store pieces of data with a small amount into one cache memory 29. By determining a cache memory 29 to be used as a cache for temporarily storing data to be recorded onto the magnetic tape 62 in accordance with the amount of the data in this way, data with a small amount can be recorded onto the magnetic tape 62 as a group of collected data. In changing the allocation of the present cache memory 29 to data to be recorded in accordance with the type of the data during an operation to record the data onto the magnetic tape 62, on the other hand, on the basis of attributes received from the command acquisition section 101 as the attributes of the data, the cache-memory allocation processing section 111 typically makes an attempt to store the data into a cache memory 29 selected typically in dependence on whether the data is a moving picture, a standstill picture, a text or data of another type. By selecting a cache memory 29 to be used as a cache for temporarily storing data to be recorded onto the magnetic tape 62 in accordance with the type of the data in this way, pieces of data of the same type can be recorded onto the magnetic tape 62 as a group of collected data.

If the determination result produced in the process carried out at the step S34 indicates that attributes of the data of the 1 recording unit to be recorded onto the magnetic tape 62 have not been received from the host computer 201, on the other hand, a cache memory 29 for temporarily storing the received data is determined on the basis of the caching state of the data already temporarily stored in the present cache memory 29.

Then, in a process carried out at the next step S37, the recording/reproduction control section 102 starts the reception of data of one recording unit from the host computer 201. To put it concretely, the USB interface 21 receives data to be recorded onto the magnetic tape 62 and passes on the data to the compression/decompression processing section 27. Subsequently, in accordance with control executed by the system controller 22 or, in other words, in accordance with control executed by the cache-memory allocation processing section 111 employed in the recording/reproduction control section 102, the compression/decompression processing section 27 compresses the data by adoption of a predetermined compression method and supplies the compressed data to the cache memory controller 28.

Then, in a process carried out at the next step S38, the recording/reproduction control section 102 temporarily stores the data in one of the cache memories 29 in accordance with allocation of the cache memories 29. To put it concretely, in accordance with control executed by the system controller 22 or, in other words, in accordance with control executed by the cache-memory allocation processing section 111 employed in the recording/reproduction control section 102, the cache memory controller 28 supplies the input compressed data to one of the cache memories 29-1 to 29-*n* to be temporarily stored therein in accordance with a result of the allocation determined in the process carried out at the step S36.

Then, in a process carried out at the next step S39, the cache-memory allocation processing section 111 employed in the recording/reproduction control section 102 produces a result of determination as to whether or not any one of the cache memories 29 has become full. If the determination result produced in the process carried out at the step S39 indicates that none of the cache memories 29 have become full, the flow of the processing goes on to a step S43 to be described later.

If the determination result produced in the process carried out at the step S39 indicates that any specific one of the cache memories 29 has become full, on the other hand, the flow of the processing goes on to a step S40. In a process carried out at the step S40, the cache-memory allocation processing section 111 employed in the recording/reproduction control section 102 changes the specific cache memory 29 to another one to be used for temporarily storing received data.

Then, in a process carried out at the next step S41, the recording/reproduction control section 102 and the driving control section 105 read out data temporarily stored in the specific cache memory 29 full of data from the specific cache memory 29, recording the data onto the magnetic tape 62. To put it concretely, in accordance with control executed by the system controller 22 or, in other words, in accordance with control executed by the recording/reproduction control section 102, the cache memory controller 28 reads out data temporarily stored in the specific cache memory 29 full of data from the specific cache memory 29 and supplies the data to the ECC processing section 30. Then, in accordance with control executed by the system controller 22 or, in other words, in accordance with control executed by the recording/reproduction control section 102, the ECC processing section 30 adds an error checking code such as a parity bit to every block of data received from the host computer 201 before supplying the data to the modulation/demodulation and RF section 31. Subsequently, in accordance with control executed by the system controller 22 or, in other words, in accordance with control executed by the recording/reproduction control section 102, the modulation/demodulation and RF section 31 converts the input data into an RF signal and carries out amplification and equalizing processes on the RF signal before supplying a result of the amplification and equalizing processes to the recording heads 41-1 and 41-2. Then, in accordance with control executed by the system controller 22 or, in other words, in accordance with control executed by the recording/reproduction control section 102, the servo controller 32 controls the mechanical driver 34 to drive each of the drum motor 35-1, the capstan motor 35-2, the supply reel motor 35-3, the take-up reel motor 35-4 and the loading motor 35-5 into rotation while referring to information stored in the EEP-ROM 33. The recording heads 41-1 and 41-2 record the input data on the magnetic tape 62 employed in the tape cassette 51 by adoption of a helical capstan method. In this way, data temporarily stored in the cache memories 29-1 to 29-*n* is recorded onto the magnetic tape 62 employed in the tape cassette 51 in group units, which are each a lump of data transferred at one time from a cache memory 29 to the magnetic tape 62 as explained earlier by referring to FIGS. 3A to 3C and 4, without regard to the amount of data in one recording unit, that is, without regard to the amount of data contained in typically one file treated as a recording unit in the host computer 201.

Then, in a process carried out at the next step S42, the recording/reproduction control section 102 provides the attribute generation section 122 with information on a recording location allocated to the data recorded onto the magnetic tape 62 as a recording location on the magnetic tape 62. The attribute generation section 122 temporarily holds the information on a recording location allocated to the data.

As described above, if the determination result produced in the process carried out at the step S39 indicates that none of the cache memories 29 have become full, the flow of the processing goes on to the step S43. The flow of the processing also goes on to the step S43 after the process carried out at the step S42 is completed. In a process carried out at the step S43, the recording/reproduction control section 102 produces a result of determination as to whether or not the processes to receive the data of the 1 recording unit and store the data in a cache memory 29 have been completed. If the determination result produced in the process carried out at the step S43 indicates that the processes to receive the data of the 1 recording unit and store the data in a cache memory 29 have not been completed, the flow of the processing goes back to the step S39 to repeat the processes of the step S39 and subsequent steps.

If the determination result produced in the process carried out at the step S43 indicates that the processes to receive the data of the one recording unit and store the data in a cache memory 29 have been completed, on the other hand, the flow of the processing goes on to a step S44. In a process carried out at the step S44, the recording/reproduction control section 102 notifies the attribute generation section 122 that the processes to receive the data of the one recording unit and store the data in a cache memory 29 have been completed. Then, the attribute generation section 122 produces a result of determination as to whether or not attributes are included in the data of the one recording unit or have been generated at the end of the process to record the data of the one recording unit onto the magnetic tape 62. Examples of attributes generated at the end of the process to record the data of the one recording unit onto the magnetic tape 62 are a group number indicating the recording location of the data and an offset from the beginning of the group indicated by the group number.

If the determination result produced in the process carried out at the step S44 indicates that attributes are included in the data of the one recording unit or have been generated at the end of the process to record the data of the one recording unit onto the magnetic tape 62, the flow of the processing goes on to a step S45. In a process carried out at the step S45, the attribute generation section 122 provides the table storage control section 123 with the attributes included in the data of the one recording unit or generated at the end of the process to record the data of the one recording unit onto the magnetic tape 62. The table storage control section 123 writes the attributes included in the data of the one recording unit or generated at the end of the process to record the data of the one recording unit onto the magnetic tape 62 in a new record associated with an identifier generated for the data, which has been received and temporarily stored in a cache memory 29. Then, the table storage control section 123 adds the new record in one of the attribute information tables. To put it concretely, the attribute information table is read out from the MIC 63 employed in the tape cassette 51, being stored temporarily in the cache memory 37, and the new record including a field used for recording the attributes of the data of the one recording unit recorded onto the magnetic tape 62 is added to the attribute information table. The attribute information table stored temporarily in the cache memory 37 is returned to the MIC 63 for example when the tape streamer drive 1 receives a command to eject the tape cassette 51 out off the tape streamer drive 1 from the host computer 201.

If the determination result produced in the process carried out at the step S44 indicates that attributes are not included in the data of the one recording unit or were not generated at the end of the process to record the data of the one recording unit onto the magnetic tape 62, on the other hand, the execution of the processing is just ended. The execution of the processing is also ended after the process carried out at the step S45 is completed.

In the processing described above, data transmitted from the host computer 201 to the tape streamer drive 1 as data of one recording unit is temporarily stored in cache memories 29. Then, the data temporarily stored in the cache memories 29 is recorded onto the magnetic tape 62 employed in the tape cassette 51 in group units, which are each a lump of data transferred at one time from a cache memory 29 to the magnetic tape 62 as explained earlier by referring to FIGS. 3A to 3C and 4. In addition, the attributes of the data transferred from the cache memories 29 to the magnetic tape 62 as the data of one recording unit are cataloged in an attribute information table.

Figure 10:
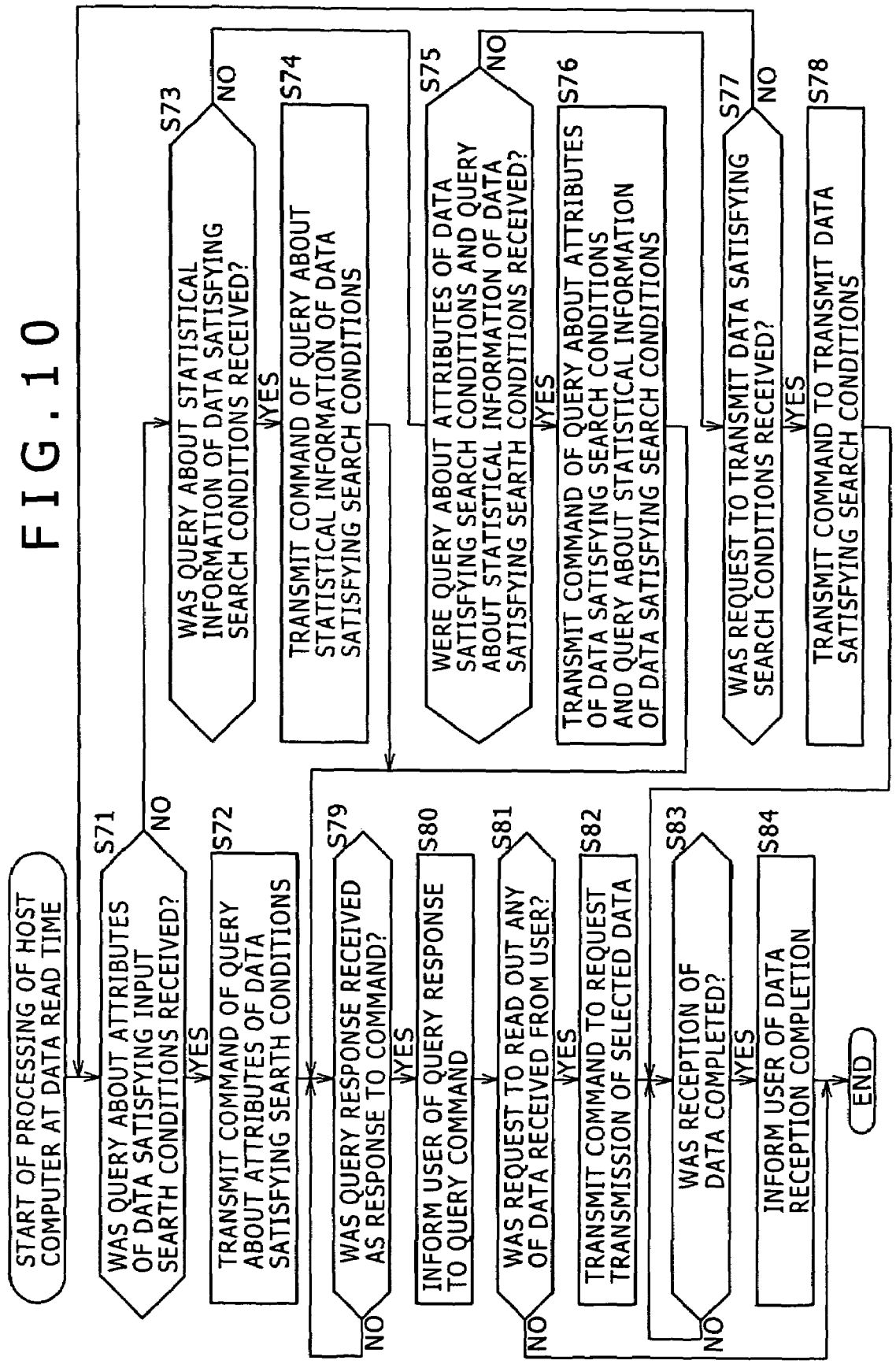
FIG. 10 shows a flowchart referred to in explanation of processing carried out by the host computer to read out data from a magnetic tape.

Next, processing carried out by the host computer 201 to read out data from the tape streamer drive 1 is explained by referring to a flowchart shown in FIG. 10. The processing explained by referring to the flowchart includes a process to search for the data to be read out from the tape streamer drive 1.

The processing represented by the flowchart shown in FIG. 10 begins with a process carried out by the CPU 211 at a step S71 to produce a result of determination as to whether or not an instruction has been received from the user as an instruction specifying an entered search condition and making a query about attributes of data satisfying the search condition. The result of such determination is produced on the basis of a signal representing an operation input entered by the user via the input section 216 to the CPU 211 by way of the input/output interface 215 and the bus 214. The instruction may specify a search condition equation in place of the search condition. As a matter of fact, in the following description, a search condition may also be interpreted as a search condition equation. If the determination result produced in the process carried out at the step S71 indicates that an instruction has not been received as an instruction specifying an entered search condition and making a query about attributes of data satisfying the search condition, the flow of the processing goes on to a step S73 to be described later.

If the determination result produced in the process carried out at the step S71 indicates that an instruction has been received from the user as an instruction specifying an entered search condition and making a query about attributes of data satisfying the search condition, on the other hand, the flow of the processing goes on to a step S72. In a process carried out at the step S72, the CPU 211 supplies a command specifying the search condition and making a query about attributes of data satisfying the search condition to the USB interface 219 by way of the bus 214 and the input/output interface 215. Then, the USB interface 219 transmits the command specifying the search condition and making a query about attributes of data satisfying the search condition to the tape streamer drive 1. Subsequently, the flow of the processing goes on to a step S79 to be described later.

As described above, if the determination result produced in the process carried out at the step S71 indicates that an instruction has not been received as an instruction specifying an entered search condition and making a query about attributes of data satisfying the search condition, the flow of the processing goes on to the step S73. In a process carried out at the step S73, the CPU 211 produces a result of determination as to whether or not an instruction has been received from the user as an instruction specifying an entered search condition and making a query about statistical information of data satisfying the search condition. The result of such determination is produced on the basis of a signal representing an operation input entered by the user via the input section 216 to the CPU 211 by way of the input/output interface 215 and the bus 214. The statistical information typically includes the number of pieces of desired data satisfying the search condition, the total amount of such pieces of data, time it takes to make an access to each piece of such data and time it takes to transfer each piece of such data to the host computer 201. If the determination result produced in the process carried out at the step S73 indicates that an instruction has not been received as an instruction specifying an entered search condition and making a query about statistical information of data satisfying the search condition, the flow of the processing goes on to a step S75 to be described later.

If the determination result produced in the process carried out at the step S73 indicates that an instruction has been received from the user as an instruction specifying an entered search condition and making a query about statistical information of data satisfying the search condition, on the other hand, the flow of the processing goes on to a step S74. In a process carried out at the step S74, the CPU 211 supplies a command specifying the search condition and making a query about statistical information of data satisfying the search condition to the USB interface 219 by way of the bus 214 and the input/output interface 215. Then, the USB interface 219 transmits the command specifying the search condition and making a query about statistical information of data satisfying the search condition to the tape streamer drive 1. Subsequently, the flow of the processing goes on to the step S79 to be described later.

As described above, if the determination result produced in the process carried out at the step S73 indicates that an instruction has not been received as an instruction specifying an entered search condition and making a query about statistical information of data satisfying the search condition, the flow of the processing goes on to the step S75. In a process carried out at the step S75, the CPU 211 produces a result of determination as to whether or not an instruction has been received from the user as an instruction specifying an entered search condition and making a query about attributes of data satisfying the search condition and about statistical information of the data. The result of such determination is produced on the basis of a signal representing an operation input entered by the user via the input section 216 to the CPU 211 by way of the input/output interface 215 and the bus 214. If the determination result produced in the process carried out at the step S75 indicates that an instruction has not been received as an instruction specifying an entered search condition and making a query about attributes of data satisfying the search condition and about statistical information of the data, the flow of the processing goes on to a step S77 to be described later.

If the determination result produced in the process carried out at the step S75 indicates that an instruction has been received from the user as an instruction specifying an entered search condition and making a query about attributes of data satisfying the search condition and about statistical information of the data, on the other hand, the flow of the processing goes on to a step S76. In a process carried out at the step S76, the CPU 211 supplies a command specifying the search condition and making a query about attributes of data satisfying the search condition and about statistical information of the data to the USB interface 219 by way of the bus 214 and the input/output interface 215. Then, the USB interface 219 transmits the command specifying the search condition and making a query about attributes of data satisfying the search condition and about statistical information of the data to the tape streamer drive 1. Subsequently, the flow of the processing goes on to the step S79 to be described later.

As described above, if the determination result produced in the process carried out at the step S75 indicates that an instruction has not been received as an instruction specifying an entered search condition and making a query about attributes of data satisfying the search condition and about statistical information of the data, the flow of the processing goes on to the step S77. In a process carried out at the step S77, the CPU 211 produces a result of determination as to whether or not an instruction has been received from the user as an instruction specifying an entered search condition and making a request for transmission of data satisfying the search condition from the tape streamer drive 1. The result of such determination is produced on the basis of a signal representing an operation input entered by the user via the input section 216 to the CPU 211 by way of the input/output interface 215 and the bus 214. If the determination result produced in the process carried out at the step S77 indicates that an instruction has not been received as an instruction specifying an entered search condition and making a request for transmission of data satisfying the search condition from the tape streamer drive 1, the flow of the processing goes back to the step S71 to repeat the processes of the step S71 and the subsequent steps.

If the determination result produced in the process carried out at the step S77 indicates that an instruction has been received from the user as an instruction specifying an entered search condition and making a request for transmission of data satisfying the search condition from the tape streamer drive 1, on the other hand, the flow of the processing goes on to a step S78. In a process carried out at the step S78, the CPU 211 supplies a command specifying the search condition and making a request for transmission of the data satisfying the search condition from the tape streamer drive 1 to the USB interface 219 by way of the bus 214 and the input/output interface 215. Then, the USB interface 219 then transmits the command specifying the search condition and making a request for transmission of data satisfying the search condition to the tape streamer drive 1. Subsequently, the flow of the processing goes on to a step S83 to be described later.

As described above, the flow of the processing goes on to the step S79 after the process carried out at the step S72, S74 or S76 is completed. In a process carried out at the step S79, the USB interface 219 produces a result of determination as to whether or not a response to the query made by the command transmitted to the tape streamer drive 1 in the process carried out at the step S72, S74 or S76 as described above has been received from the tape streamer drive 1, which transmits the response in a process carried out at the step S120 of a flowchart to be explained later by referring to FIG. 11. If the determination result produced in the process carried out at the step S79 indicates that a response to the query made by the command transmitted to the tape streamer drive 1 has not been received from the tape streamer drive 1, the flow of the processing goes back to the step S79 at which the process of the step S79 is repeated. As a matter fact, the process of the step S79 is carried out repeatedly till the determination result produced in the process carried out at the step S79 indicates that a response to the query made by the command transmitted to the tape streamer drive 1 has been received from the tape streamer drive 1.

As the determination result produced in the process carried out at the step S79 indicates that a response to the query made by the command transmitted to the tape streamer drive 1 has been received from the tape streamer drive 1, the flow of the processing goes on to a step S80. In a process carried out at the step S80, the USB interface 219 passes on the response to the query made by the command transmitted to the tape streamer drive 1 to the CPU 211. On the basis of the response to the query made by the command transmitted to the tape streamer drive 1, the CPU 211 generates displayed-picture data for displaying a picture of the response to the query on a display unit employed in the output section 217 and generates audio data for outputting sounds of the response from the speaker employed in the output section 217. The CPU 211 then supplies the displayed-picture data and the audio data to the output section 217 by way of the bus 214 and the input/output interface 215 to display the picture of the response to the query on the display unit and output the sounds of the response from the speaker so as to notify the user of the response.

In a process carried out at the next step S81, the CPU 211 produces a result of determination as to whether or not an instruction has been received from the user as an instruction making a request for an operation to read out data from the tape streamer drive 1. The data is data selected by the user on the basis of the query response reported to the user in the process carried out at the step S80. The result of such determination is produced on the basis of a signal representing an operation input entered by the user via the input section 216 to the CPU 211 by way of the input/output interface 215 and the bus 214. If the determination result produced in the process carried out at the step S81 indicates that an instruction has not been received from the user as an instruction making a request for an operation to read out the data from the tape streamer drive 1, the execution of the processing is ended.

If the determination result produced in the process carried out at the step S81 indicates that an instruction has been received from the user as an instruction making a request for an operation to read out the data from the tape streamer drive 1, on the other hand, the flow of the processing goes on to a step S82. In a process carried out at the step S82, the CPU 211 supplies a command making a request for an operation to read out the data from the tape streamer drive 1 to the USB interface 219 by way of the bus 214 and the input/output interface 215. Then, the USB interface 219 transmits the command making a request for an operation to read out the data from the tape streamer drive 1 to the tape streamer drive 1.

Then, the flow of the processing goes on to a step S83. The flow of the processing also goes on to the step S83 after the process carried out at the step S78 is completed. In a process carried out at the step S83, the USB interface 219 produces a result of determination as to whether or not all the data has been received completely as data transmitted by the tape streamer drive 1 in response to the command transmitted to the tape streamer drive 1 in a process carried out at the step S82 or S78. If the determination result produced in the process carried out at the step S83 indicates that all the data has not been received completely from the tape streamer drive 1, the flow of the processing goes back to the step S83 at which the process of the step S83 is repeated. As a matter fact, the process of the step S83 is carried out repeatedly till the determination result produced in the process carried out at the step S83 indicates that all the data has been received completely from the tape streamer drive 1.

As the determination result produced in the process carried out at the step S83 indicates that all the data has been received completely from the tape streamer drive 1, the flow of the processing goes on to a step S84. In a process carried out at the step S84, the USB interface 219 stores the received data in the storage section 218 and sends a notice to the CPU 211 by way of the input/output interface 215 and the bus 214 as a notice informing the CPU 211 that the process to receive the data has been completed. Informed of the fact that the process to receive the data has been completed, the CPU 211 generates displayed-picture data used for displaying a message or a picture on the display unit employed in the output section 217 as a notice informing the user of the completion of the process to receive the data. Typically, the CPU 211 also generates audio data used for outputting an audio message from the speaker employed in the output section 217. Then, the CPU 211 supplies the generated displayed-picture data and the generated audio data to the output section 217 by way of the bus 214 and the input/output interface 215 to inform the user that the process to receive the data has been completed.

In the processing described above, the host computer 201 transmits a query to the tape streamer drive 1 as an inquiry about data already recorded on the magnetic tape 62 employed in the tape cassette 51 mounted on the tape streamer drive 1 and then notifies the user of a response to the query by displaying a picture showing the response and/or generating a sound of the response. By transmitting a request to the tape streamer drive 1 as a request for an operation to read out data matching a search condition or data selected by the user, the host computer 201 is also capable of receiving the data from the tape streamer drive 1.

Figure 11:
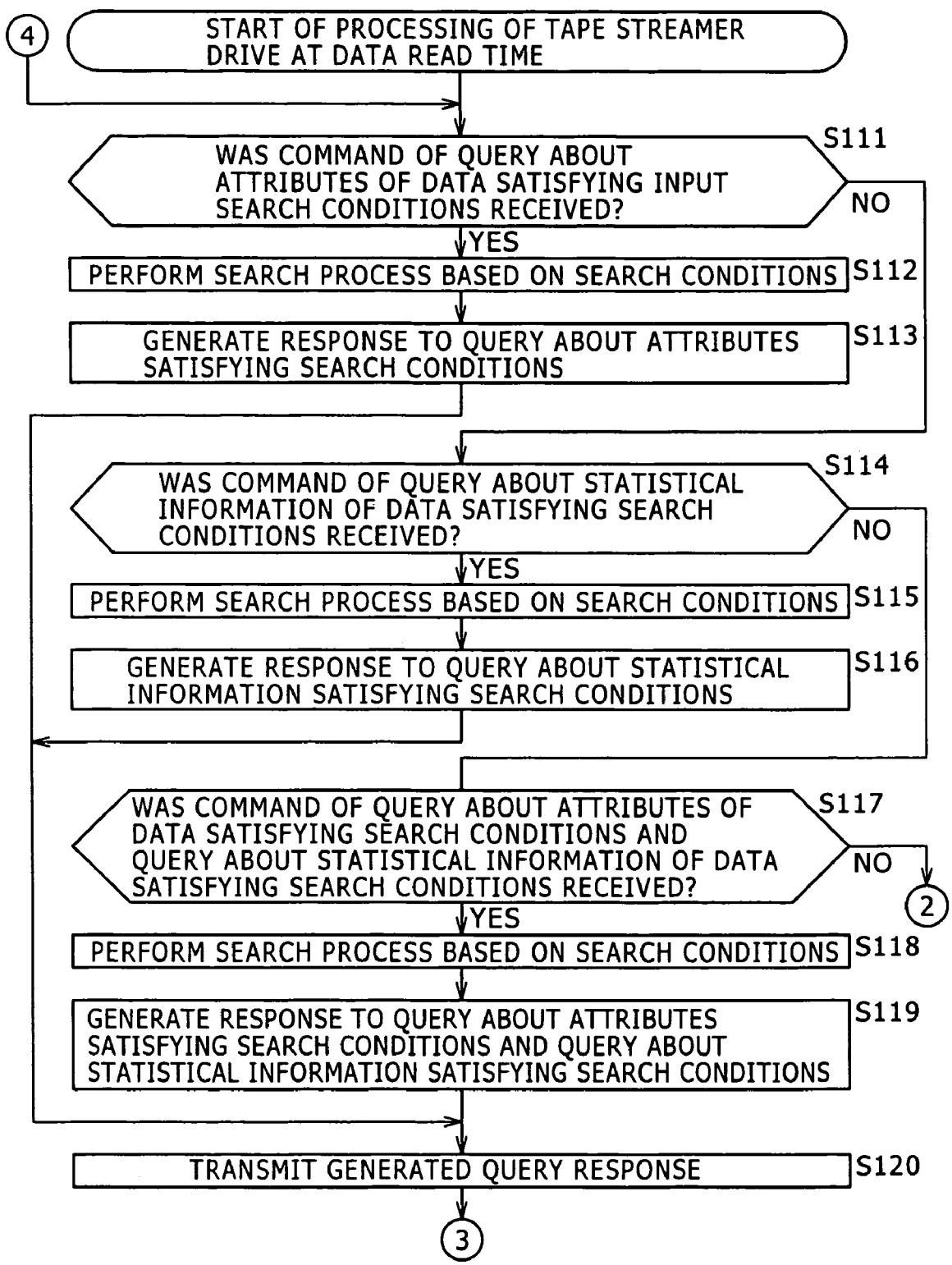
FIG. 11 shows a flowchart referred to in explanation of processing carried out by the tape streamer drive to read out data from a magnetic tape.
Figure 12:
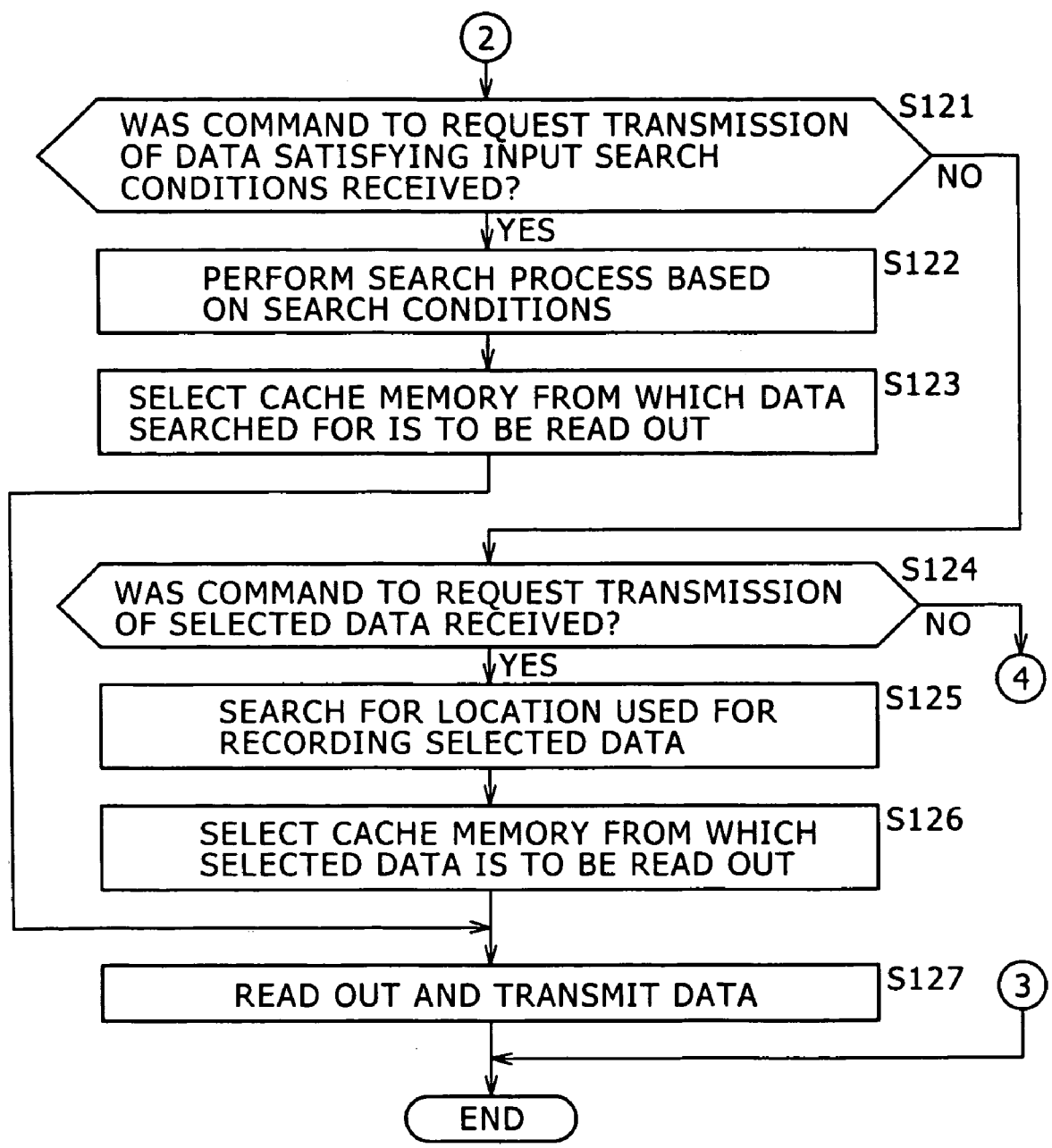
FIG. 12 shows a continuation of the flowchart referred to in explanation of the processing carried out by the tape streamer drive to read out data from the magnetic tape.

By referring to a flowchart shown in FIGS. 11 and 12, the following description explains processing carried out by the tape streamer drive 1 to read out data from the magnetic tape 62 as processing concurrent to the processing carried out by the host computer 201 to read out the data from the tape streamer drive 1 as described earlier by referring to the flowchart shown in FIG. 10.

The processing represented by the flowchart shown in FIGS. 11 and 12 begins with a process carried out by the command acquisition section 101 at a step S111 to produce a result of determination as to whether or not a command serving as a query about attributes of data satisfying a search condition has been received from the host computer 201. The host computer 201 transmits the command serving as a query about attributes of data satisfying a search condition to the tape streamer drive 1 in the process carried out at the step S72 of the flowchart shown in FIG. 10. If the determination result produced in the process carried out at the step S111 indicates that a command serving as a query about attributes of data satisfying a search condition has not been received from the host computer 201, the flow of the processing goes on to a step S114 to be described later.

If the determination result produced in the process carried out at the step S111 indicates that a command serving as a query about attributes of data satisfying a search condition has been received from the host computer 201, on the other hand, the flow of the processing goes on to a step S112. In a process carried out at the step S112, the command acquisition section 101 supplies the search condition to the search processing section 124 employed in the table processing section 104. Then, the search processing section 124 controls the table-read control section 125 to read out an attribute information table from the MIC 63 employed in the tape cassette 51 and save the attribute information table in the cache memory 37. Subsequently, the search processing section 124 searches the attribute information table for attributes satisfying the search condition received from the command acquisition section 101.

Then, in a process carried out at the next step S113, the search processing section 124 provides the query-result information generation processing section 126 with a record matching the search condition or the search condition equation as a result of the search process. On the basis of the search-process result received from the search processing section 124 as the record matching the search condition or the search condition equation, the query-result information generation processing section 126 generates a response to the query about attributes of data satisfying the search condition and supplies the response to the query-result information supply control section 127. The flow of the processing then goes to a step S120 to be described later. If the result of the search process comprises a plurality of records satisfying the search condition or the search condition equation, the response to the query can have a table format or can be provided as a set composed of the records. As an alternative, the response to the query may also include only attributes matching the query. Examples of the attributes matching the query are the name of a file containing the desired data and the amount of the desired data.

FIGS. 13A to 13C are diagrams showing typical table formats of the response to a query for a case in which the result of a search process includes a plurality of records satisfying the search condition or the search condition equation. To be more specific, FIG. 13A is a diagram showing a typical search-result table showing a result of a search process for a case in which the user specifies the names of files as a search condition. FIG. 13B is a diagram showing a typical search-result table showing a result of a search process for a case in which the user specifies a range of file creation dates/times and a range of data amounts as a search condition. FIG. 13C is a diagram showing a typical search-result table showing a result of a search process for a case in which the user specifies the names of files containing a text and a range of file creation dates/times as a search condition.

If the determination result produced in the process carried out at the step S111 indicates that a command serving as a query about attributes of data satisfying a search condition has not been received from the host computer 201, the flow of the processing goes on to the step S114 as described above. In a process carried out at the step S114, the command acquisition section 101 produces a result of determination as to whether or not a command serving as a query about statistical information of data satisfying a search condition has been received from the host computer 201. The host computer 201 transmits the command serving as a query about statistical information of data satisfying a search condition to the tape streamer drive 1 in the process carried out at the step S74 of the flowchart shown in FIG. 10. If the determination result produced in the process carried out at the step S114 indicates that a command serving as a query about statistical information of data satisfying a search condition has not been received from the host computer 201, the flow of the processing goes on to a step S117 to be described later.

If the determination result produced in the process carried out at the step S114 indicates that a command serving as a query about statistical information of data satisfying a search condition has been received from the host computer 201, on the other hand, the flow of the processing goes on to a step S115. In a process carried out at the step S115, the command acquisition section 101 supplies the search condition to the search processing section 124 employed in the table processing section 104. Then, the search processing section 124 controls the table-read control section 125 to read out an attribute information table from the MIC 63 employed in the tape cassette 51 and save the attribute information table in the cache memory 37. Subsequently, the search processing section 124 searches the attribute information table for statistical information of data satisfying the search condition received from the command acquisition section 101.

Then, in a process carried out at the next step S116, the search processing section 124 provides the query-result information generation processing section 126 with a record matching the search condition or the search condition equation as a result of the search process. On the basis of the search-process result received from the search processing section 124 as the record matching the search condition or the search condition equation, the query-result information generation processing section 126 generates a response to the query about statistical information of data satisfying the search condition and supplies the response to the query-result information supply control section 127. The flow of the processing then goes to the step S120 mentioned above. The statistical information typically includes the number of pieces of desired data satisfying the search condition, the total amount of such pieces of data, time it takes to make an access to each of the pieces of data and time it takes to transfer each of the pieces of data to the host computer 201.

If the determination result produced in the process carried out at the step S114 indicates that a command serving as a query about statistical information of data satisfying a search condition has not been received from the host computer 201, the flow of the processing goes on to the step S117 as described above. In a process carried out at the step S117, the command acquisition section 101 produces a result of determination as to whether or not a command serving as a query about attributes of data satisfying a search condition and a query about statistical information of such data has been received from the host computer 201. The host computer 201 transmits the command serving as a query about attributes of data satisfying a search condition and a query about statistical information of such data to the tape streamer drive 1 in the process carried out at the step S76 of the flowchart shown in FIG. 10. If the determination result produced in the process carried out at the step S117 indicates that a command serving as a query about attributes of data satisfying a search condition and a query about statistical information of such data has not been received from the host computer 201, the flow of the processing goes on to a step S121 to be described later.

If the determination result produced in the process carried out at the step S117 indicates that a command serving as a query about attributes of data satisfying a search condition and a query about statistical information of such data has been received from the host computer 201, on the other hand, the flow of the processing goes on to a step S118. In a process carried out at the step S118, the command acquisition section 101 supplies the search condition to the search processing section 124 employed in the table processing section 104. Then, the search processing section 124 controls the table-read control section 125 to read out an attribute information table from the MIC 63 employed in the tape cassette 51 and save the attribute information table in the cache memory 37. Subsequently, the search processing section 124 searches the attribute information table for attributes and statistical information, which satisfy the search condition received from the command acquisition section 101.

Then, in a process carried out at the next step S119, the search processing section 124 provides the query-result information generation processing section 126 with a record matching the search condition or the search condition equation as a result of the search process. On the basis of the search-process result received from the search processing section 124 as the record matching the search condition or the search condition equation, the query-result information generation processing section 126 generates a response to the query about attributes of data satisfying a search condition and a query about statistical information of such data, supplying the response to the query-result information supply control section 127.

After the process carried out at the step S113, S116 or S119 is completed, the flow of the processing goes on to the step S120. In a process carried out at the step S120, the query-result information supply control section 127 transmits the response to the queries to the host computer 201. Finally, the execution of the processing is ended.

If the determination result produced in the process carried out at the step S117 indicates that a command serving as a query about attributes of data satisfying a search condition and a query about statistical information of such data has not been received from the host computer 201, the flow of the processing goes on to the step S121 as described above. In a process carried out at the step S121, the command acquisition section 101 produces a result of determination as to whether or not a command serving as a request for transmission of the data matching the search equation to the host computer 201 has been received from the host computer 201. The host computer 201 transmits the command serving as a request for transmission of the data matching the search equation to the tape streamer drive 1 in the process carried out at the step S78 of the flowchart shown in FIG. 10. If the determination result produced in the process carried out at the step S121 indicates that a command serving as a request for transmission of the data matching the search equation to the host computer 201 has not been received from the host computer 201, the flow of the processing goes on to a step S124 to be described later.

If the determination result produced in the process carried out at the step S121 indicates that a command serving as a request for transmission of the data matching the search equation to the host computer 201 has been received from the host computer 201, on the other hand, the flow of the processing goes on to a step S122. In a process carried out at the step S122, the command acquisition section 101 supplies the search condition to the search processing section 124 employed in the table processing section 104. Then, the search processing section 124 controls the table-read control section 125 to read out an attribute information table from the MIC 63 employed in the tape cassette 51 and save the attribute information table in the cache memory 37. Subsequently, the search processing section 124 searches the attribute information table for a record satisfying the search condition received from the command acquisition section 101. The record obtained as a result of the search process always includes attributes of the data satisfying the search condition.

Then, in a process carried out at the next step S123, the search processing section 124 supplies the result of the search process to the recording/reproduction control section 102. Receiving the result of the search process, the cache-memory allocation processing section 111 employed in the recording/reproduction control section 102 selects a cache memory 29 to be used for temporarily storing data read out from the magnetic tape 62 as the data satisfying the search condition. Then, the flow of the processing goes on to a step S127 to be described later.

If the determination result produced in the process carried out at the step S121 indicates that a command serving as a request for transmission of the data matching the search equation to the host computer 201 has not been received from the host computer 201, the flow of the processing goes on to the step S124 as described above. In a process carried out at the step S124, the command acquisition section 101 produces a result of determination as to whether or not a command serving as a request for transmission of data selected by the user to the host computer 201 has been received from the host computer 201. The host computer 201 transmits the command serving as a request for transmission of data selected by the user to the tape streamer drive 1 in the process carried out at the step S82 of the flowchart shown in FIG. 10. If the determination result produced in the process carried out at the step S124 indicates that a command serving as a request for transmission of the data selected by the user to the host computer 201 has not been received from the host computer 201, the flow of the processing goes back to the step S111 to repeat the processes of the step S111 and the subsequent steps.

If the determination result produced in the process carried out at the step S124 indicates that a command serving as a request for transmission of the data selected by the user to the host computer 201 has been received from the host computer 201, on the other hand, the flow of the processing goes on to a step S125. In a process carried out at the step S125, the command acquisition section 101 supplies information on the data selected by the user to the search processing section 124 employed in the table processing section 104. Then, the search processing section 124 controls the table-read control section 125 to read out an attribute information table from the MIC 63 employed in the tape cassette 51 and save the attribute information table in the cache memory 37. Subsequently, the search processing section 124 searches the attribute information table for a recording location of the data selected by the user and notifies the recording/reproduction control section 102 of a result of the search process.

In a process carried out at the step S126 after receiving the result of the search process, the cache-memory allocation processing section 111 employed in the recording/reproduction control section 102 selects a cache memory 29 to be used for temporarily storing data read out from the magnetic tape 62 as the data selected by the user.

Then, the flow of the processing goes on to a step S127. The flow of the processing also goes on to the step S127 after either process carried out at the step S123 or step S126 described above is completed. In a process carried out at the step S127, the recording/reproduction control section 102 and the driving control section 105 read out the data satisfying the search condition or the data selected by the user from the magnetic tape 62 on the basis of information included in the received result of the search process as information on the data recording location on the magnetic tape 62 and stores the data in the selected cache memory 29 in the so-called reproduction operation. Then, the data is transmitted to the host computer 201. Finally, the execution of the processing is ended.

To put it concretely, in accordance with control executed by the system controller 22 or, in other words, in accordance with control executed by the driving control section 105, the servo controller 32 controls the mechanical driver 34 to drive each of the drum motor 35-1, the capstan motor 35-2, the supply reel motor 35-3, the take-up reel motor 35-4 and the loading motor 35-5 into rotation while referring to information stored in the EEP-ROM 33. While each of the drum motor 35-1, the capstan motor 35-2, the supply reel motor 35-3, the take-up reel motor 35-4 and the loading motor 35-5 is rotating, the reproduction heads 42-1 to 42-3 read out the data from the magnetic tape 62 and supply the data to modulation/demodulation and RF section 31 as an RF signal.

Then, in accordance with control executed by the system controller 22 or, in other words, in accordance with control executed by the recording/reproduction control section 102, the modulation/demodulation and RF section 31 carries out a reproduction equalizing process on the RF signal received from the reproduction heads 42-1 to 42-3, demodulates a signal obtained as a result of the reproduction equalizing process and supplies the demodulated signal to the ECC processing section 30. Subsequently, in accordance with control executed by the system controller 22 or, in other words, in accordance with control executed by the recording/reproduction control section 102, on the basis of error correction codes included in the demodulated data received from the modulation/demodulation and RF section 31, the ECC processing section 30 detects errors existing in the data, if any, corrects the errors and supplies the data with errors corrected to the cache memory controller 28.

Then, in accordance with control executed by the system controller 22 or, in other words, in accordance with control executed by the cache-memory allocation processing section 111 employed in the recording/reproduction control section 102, the cache memory controller 28 supplies the compressed data received from the ECC processing section 30 to one of the cache memories 29-1 to 29-$n$ and also reads out compressed data from specific one of the cache memories 29-1 to 29-$n$, supplying the compressed data read out from the specific cache memories 29 to the compression/decompression processing section 27. Subsequently, in accordance with control executed by the system controller 22 or, in other words, in accordance with control executed by the recording/reproduction control section 102, the compression/decompression processing section 27 decompresses the compressed data received from the cache memory controller 28 and supplies the decompressed data to the USB interface 21. Then, the USB interface 21 transmits the decompressed data received from the compression/decompression processing section 27 to the host computer 201. The data transmitted to the host computer 201 is data read out from the magnetic tape 62 and subjected to a variety of processes.

In the processing described above, the tape streamer drive 1 searches an attribute information table stored in the MIC 63 for attributes of data satisfying a search condition specified in a command received from the host computer 201 as a command making a query, statistical information of such data or both and transmits the attributes and/or the statistical information to the host computer 201 as a response to the query. If the response to the query includes a plurality of records satisfying the search condition or the search condition equation, the response to the query can have a table format or can be provided as a set composed of the records. As an alternative, the response to the query may also include only attributes matching the query. Examples of the attributes matching the query are the name of a file containing the desired data, the amount of the desired data, time it takes to make an access to the data and time it takes to transfer the desired data to the host computer 201 in case it is necessary to transfer the data thereto.

In addition, in accordance with a command received from the host computer 201, the tape streamer drive 1 reads out data matching the query or data selected by the user from the magnetic tape 62 and transmits the data to the host computer 201.

Figure 14:
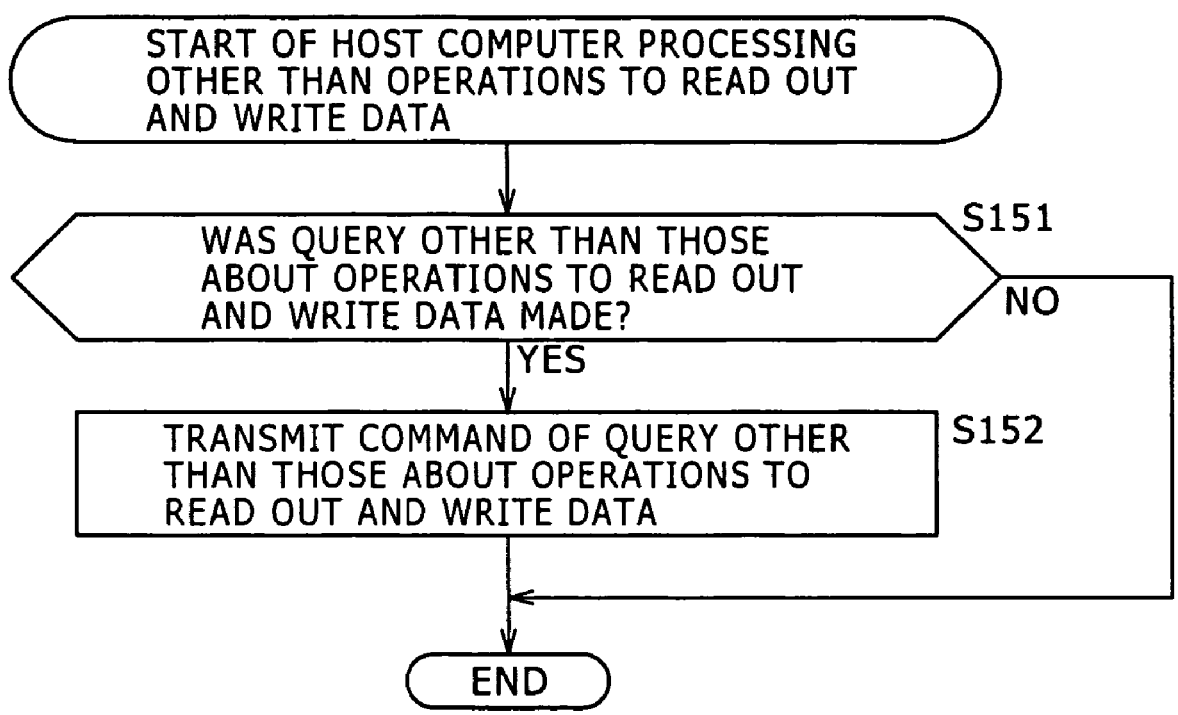
FIG. 14 shows a flowchart referred to in explanation of processing carried out by the host computer as processing other than data recording and reproduction operations.

By referring to a flowchart shown in FIG. 14, the following description explains processing carried out by the host computer 201 as processing other than the data recording processing and the data reproduction processing.

The processing represented by the flowchart begins with a process carried out by the CPU 211 at a step S151 to produce a result of determination as to whether or not an instruction has been received from the user as an instruction other than a data recording or reproduction instruction. The result of such determination is produced on the basis of a signal representing an operation input entered by the user via the input section 216 to the CPU 211 by way of the input/output interface 215 and the bus 214. An example of the instruction other than a data recording or reproduction instruction is an instruction making a query about information such as information on the tape cassette 51, information on the tape streamer drive 1 or statistical information irrelevant to a search process. The information on the tape cassette 51 typically includes the name of the manufacturer of the tape cassette 51 mounted on the tape streamer drive 1, the number of loading operations carried out so far on the tape cassette 51, the manufacturing date/time of the tape cassette 51, the locations of bad spots in the tape cassette 51 and the size of a recording area remaining in the magnetic tape 62 employed in the tape cassette 51. On the other hand, the information on the tape streamer drive 1 typically includes the name of the manufacturer of the tape streamer drive 1, the serial number of the tape streamer drive 1, the manufacturing date/time of the tape streamer drive 1, the present temperature of the tape streamer drive 1 and the present quantity of the magnetic tape 62 already wound around the take-up reel employed in the tape cassette 51. The statistical information irrelevant to a search process typically includes the number of recording units of data already recorded on the magnetic tape 62 employed in the tape cassette 51, the total amount of data already recorded on the magnetic tape 62 and estimated time it takes to read out a predetermined file from the magnetic tape 62.

If the determination result produced in the process carried out at the step S151 indicates that an instruction has been received from the user as an instruction other than a data reading or reproduction instruction, the flow of the processing goes on to a step S152 at which the CPU 211 gives a query command other than a data reading or reproduction command to the USB interface 219 by way of the bus 214 and the input/output interface 215. Then, the bus 214 transmits the query command other than a data reading or reproduction command to the tape streamer drive 1.

If the determination result produced in the process carried out at the step S151 indicates that an instruction has not been received from the user as an instruction other than a data reading or reproduction instruction, on the other hand, the execution of the processing is ended. The execution of the processing is ended also after the processing carried out at the step S152 is completed.

By carrying out the processing described above, the host computer 201 is capable of transmitting a query command other than a data reading or reproduction command to the tape streamer drive 1. An example of the query command other than a data reading or reproduction command is a command making a query about information on the tape cassette 51, information on the tape streamer drive 1 or statistical information irrelevant to a search process.

Figure 15:
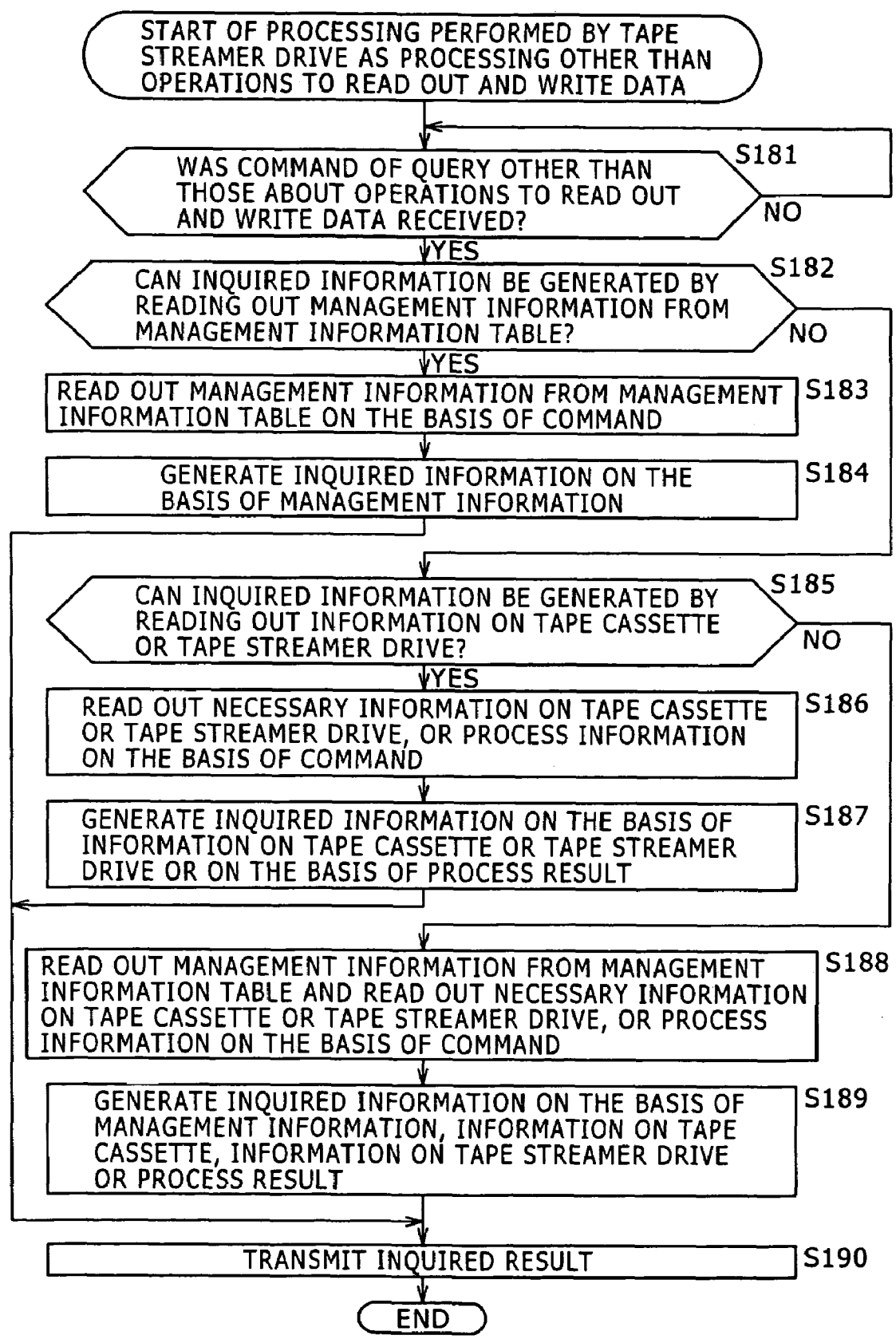
FIG. 15 shows a flowchart referred to in explanation of processing carried out by the tape streamer drive as processing other than data recording and reproduction operations.

By referring to a flowchart shown in FIG. 15, the following description explains processing carried out by the tape streamer drive 1 concurrently to the processing carried out by the host computer 201 as processing other than data recording or reproduction processing as explained earlier by referring to the flowchart shown in FIG. 14.

The processing represented by the flowchart shown in FIG. 15 begins with a process carried out by the command acquisition section 101 at a step S181 to produce a result of determination as to whether or not a command has been received from the host computer 201 as a query command other than a data recording or reproduction command. The host computer 201 transmits such a command in a process carried out at the step S152 of the flowchart shown in FIG. 14. If the determination result produced at the step S181 indicates that a command has not been received from the host computer 201 as a query command other than a data recording or reproduction command, the flow of the processing goes back to the step S181 at which the process of the step S181 is repeated. As a matter of fact, the process of the step S181 is carried out repeatedly till the result of the determination indicates that a command has been received from the host computer 201 as a query command other than a data recording or reproduction command.

As the determination result produced in the process carried out at the step S181 indicates that a command has been received from the host computer 201 as a query command other than a data recording or reproduction command, the flow of the processing goes on to a step S182. In a process carried out at the step S182, the command acquisition section 101 passes on the received query command to the query-result information generation processing section 126. Then, the query-result information generation processing section 126 produces a result of determination as to whether or not a response to a query of the received command can be generated from attributes cataloged in an attribute information table. If the query made by the command is a query about the number of recording units of data already recorded on the magnetic tape 62 employed in the tape cassette 51 mounted on the tape streamer drive 1 or the total amount of the data already recorded on the magnetic tape 62, for example, the determination result produced in the process carried out at the step S182 indicates that a response to the query of the received command can be generated from attributes cataloged in an attribute information table. If the determination result produced in the process carried out at the step S182 indicates that a response to the query of the received command cannot be generated from attributes cataloged in an attribute information table, on the other hand, the flow of the processing goes on to a step S185 to be described later.

If the determination result produced in the process carried out at the step S182 indicates that a response to the query of the received command can be generated from attributes cataloged in an attribute information table, the flow of the processing goes on to a step S183. In a process carried out at the step S183, the query-result information generation processing section 126 controls the table-read control section 125 to read out the attributes from the attribute information table in accordance with the command.

Then, in a process carried out at the step S184, the query-result information generation processing section 126 generates a response to the query of the received command from the attributes read out by the table-read control section 125 from the attribute information table and supplies the response of the query to the query-result information supply control section 127. Subsequently, the flow of the processing goes on to a step S190 to be described later.

If the determination result produced in the process carried out at the step S182 indicates that a response to the query of the received command cannot be generated from attributes cataloged in an attribute information table, the flow of the processing goes on to the step S185 as described above. In a process carried out at the step S185, the query-result information generation processing section 126 produces a result of determination as to whether or not a response to a query of the received command can be generated from information read out from the ROM 24 or the MIC 63 as information on the tape cassette 51 or information on the tape streamer drive 1. If the query made by the command is a query about information on the tape cassette 51 or information on the tape streamer drive 1, for example, the determination result produced in the process carried out at the step S185 indicates that a response to the query of the received command can be generated from information read out from the ROM 24 or the MIC 63 as information on the tape cassette 51 or information on the tape streamer drive 1. If the query made by the command is a query about information that must be generated from both attributes stored in an attribute information table and information on the tape cassette 51 or information on the tape streamer drive 1, however, the determination result produced in the process carried out at the step S185 indicates that a response to the query of the received command cannot be generated from only the information read out from the ROM 24 or the MIC 63 as information on the tape cassette 51 or information on the tape streamer drive 1. In this case, the flow of the processing goes on to a step S188 to be described later. An example of the query about information that must be generated from both attributes stored in an attribute information table and information on the tape cassette 51 or information on the tape streamer drive 1 is time it takes to read out a predetermined file from the magnetic tape 62.

If the determination result produced in the process carried out at the step S185 indicates that a response to the query made by the received command can be generated from information read out from the ROM 24 or the MIC 63 as information on the tape cassette 51 or information on the tape streamer drive 1, the flow of the processing goes on to a step S186. In a process carried out at the step S186, in accordance with the command, the query-result information generation processing section 126 reads out the information on the tape cassette 51 and/or the information on the tape streamer drive 1 from the ROM 24 and/or the MIC 63, or carries out a process on the basis of the pieces of information read out from the ROM 24 or the MIC 63.

Then, in a process carried out at the next step S187, on the basis of the information on the tape cassette 51 and/or the information on the tape streamer drive 1 or a result of the process carried out at the step S186, the query-result information generation processing section 126 generates a response to the query and supplies the response to the query-result information supply control section 127. Subsequently, the flow of the processing goes on to the aforementioned step S190 to be described later.

If the determination result produced in the process carried out at the step S185 indicates that a response to the query of the received command cannot be generated from only information read out from the ROM 24 or the MIC 63 as information on the tape cassette 51 or information on the tape streamer drive 1, the flow of the processing goes on to the step S188 as described above. In a process carried out at the step S188, in accordance with the command, the query-result information generation processing section 126 controls the table-read control section 125 to read out attributes from the attribute information table and reads out the information on the tape cassette 51 and/or the information on the tape streamer drive 1 from the ROM 24 and/or the MIC 63, or carries out a process on the basis of the attributes read out from the attribute information table the pieces of information read out from the ROM 24 or the MIC 63.

Then, in a process carried out at the next step S189, on the basis of the attributes and the information on the tape cassette 51 and/or the information on the tape streamer drive 1 or on the basis of a result of the process carried out at the step S188, the query-result information generation processing section 126 generates a response to the query and supplies the response to the query-result information supply control section 127. Subsequently, the flow of the processing goes on to the aforementioned step S190.

After the process carried out the step S184, S187 or S189 is completed, the flow of the processing goes on to the step S190. In a process carried out at the step S190, the query-result information supply control section 127 transmits the query response generated by the query-result information generation processing section 126 to the host computer 201. Finally, the execution of the processing is ended.

In the processing described above, in accordance with a command received from the host computer 201 as a query command other than a data recording or reproduction command, the tape streamer drive 1 generates a response to a query made by the received command on the basis of attributes read out from an attribute information table, information read out from the ROM 24 and/or the MIC 63 as information on the tape streamer drive 1 and/or the tape cassette 51 or both the attributes and the information on the tape streamer drive 1 and/or the tape cassette 51, transmitting the response to the host computer 201.

Thus, by applying the present invention, it is possible to search a recording medium, which is used for sequentially recording data, for desired data and make a query about information on desired data without the need to scan the data recorded on the recording medium such as a magnetic file from the beginning of the medium. Thus, a process to search a recording medium for desired data matching a query and a process to generate a response to such a query can be carried out with ease. In addition, it is possible to shorten time it takes to carry out these processes.

In particular, by applying the present invention, the tape streamer drive 1 is capable of storing information on data, which is recorded on the magnetic tape 62 employed in the tape cassette 51 mounted on the tape streamer drive 1, in a MIC 63 typically in the form of an attribute information table having the format of a relational database. Thus, when the host computer 201 issues a command to the tape streamer drive 1 to make a query described in the SQL syntax as a query about information on data recorded on the magnetic tape 62 employed in the tape cassette 51 mounted on the tape streamer drive 1, the tape streamer drive 1 is capable of easily extracting or finding attributes and/or statistical information, which are associated with a particular piece of data selected among pieces of data recorded on the magnetic tape 62 as a piece of data satisfying a condition specified in the command or the particular data itself and transmitting the attributes, the statistical information and/or the particular data to the host computer 201.

It is to be noted that, in the tape streamer drive 1 to which the present invention is applied, the cache memories 29-1 to 29-*n* are each a hybrid memory that can each be used for temporarily storing data in both a data recording operation and a data reproduction operation. That is to say, cache memories 29 for temporarily storing data in data recording operations are not separated physically from cache memories 29 for temporarily storing data in data reproduction operations. By providing a plurality of such cache memories 29-1 to 29-*n*, the tape streamer drive 1 applying the present invention is capable of selecting one of the cache memories 29-1 to 29-*n* as a memory for temporarily storing data to be recorded on the basis of attributes received prior to reception of the data as attributes of the data before the data is actually recorded onto the magnetic tape 62. In this way, data is recorded onto the magnetic tape 62 in group units which are each a collection of pieces of data each having a small amount or pieces of data having the same type such as a moving picture, a standstill picture or a text.

In addition, without regard to the number of cache memories 29, the tape streamer drive 1 generates an attribute information table based on attributes of data recorded on the magnetic tape 62 and stores the attribute information table in the MIC 63 employed in the tape cassette 51. In an operation to reproduce data from the magnetic tape 62, the tape streamer drive 1 searches the attribute information table for desired attributes of desired data and computes statistical information of the desired data from the attributes.

It is to be noted that the scope of the present invention is not limited to an operation to record data onto a magnetic tape. That is to say, the present invention can be applied to any operation as long as the operation is an operation to record/reproduce data onto/from a recording medium sequentially. When the present invention is applied to an operation to record data onto a CD-R, for example, the present invention exhibits the same effects as the operation to record data onto a magnetic tape. It is to be noted that, since a CD-R does not have a MIC, the attribute information table can be stored in a portion selected from the recording area of the CD-R as a portion specially allocated to the attribute information table.

As explained earlier, the series of processes described previously can be carried out by execution of software. If the series of processes described above is carried out by execution of software, programs composing the software can be installed into a computer embedded in dedicated hardware, a general-purpose personal computer or the like from typically recording media. By installing a variety of programs into the general-purpose personal computer, the personal computer is capable of carrying out a variety of functions.

The aforementioned recording media for recording programs to be installed into a computer or a general-purpose personal computer as programs to be executed by the computer or the general-purpose personal computer respectively is a removable or package recording medium provided to the user separately from the computer or the general-purpose personal computer. Examples of the removable recording medium 71 provided to the computer or general-purpose personal computer serving as the tape streamer drive 1 shown in FIG. 1 include a magnetic disk such as a flexible disk, an optical disk such as a CD-ROM (Compact Disk—Read Only Memory) or a DVD (Digital Versatile Disk), a magneto-optical disk such as an MD (Mini Disk) as well as a semiconductor memory. On the other hand, examples of the package recording medium provided to the computer or general-purpose personal computer serving as the host computer 201 shown in FIG. 5 include a magnetic disk 231 such as a flexible disk, an optical disk 232 such as a CD-ROM (Compact Disk—Read Only Memory) or a DVD (Digital Versatile Disk), a magneto-optical disk 233 such as an MD (Mini Disk) as well as a semiconductor memory 234.

It is also worth noting that, in this specification, steps of the flowchart described above can be carried out not only in a pre-prescribed order along the time axis, but also concurrently or individually.

In addition, it should be understood by those skilled in the art that a variety of modifications, combinations, sub-combinations and alterations may occur in dependence on design requirements and other factors insofar as they are within the scope of the appended claims or the equivalents thereof.

The invention claimed is:

1. An information-processing apparatus for recording data on a recording medium used for sequentially recording data, the information-processing apparatus comprising:

acquisition means for acquiring data to be recorded onto the recording medium and for acquiring an attribute of the data also to be recorded onto the recording medium;

data recording means for recording the data in a first recording area of the recording medium;

attribute recording means for recording the attribute of the data in a second recording area of the recording medium different from the first recording area, the attribute being recorded in a table format associating the attribute with the data; and attribute generation means for generating a further attribute based on the attribute acquired by the acquisition means or based on a result of an operation carried out by the data recording means to record data on the recording medium, wherein the attribute recording means records the further attribute onto the second recording area of the recording medium.

2. An information-processing apparatus for recording data on a recording medium used for sequentially recording data, the information-processing apparatus comprising:

acquisition means for acquiring data to be recorded onto the recording medium and for acquiring attributes of the data also to be recorded onto the recording medium;

data recording means for recording the data in a first recording area of the recording medium; and attribute recording means for recording the attributes of the data in a second recording area of the recording medium different from the first recording area, the attributes being recorded in a table format associating the attribute or attributes with the data, wherein the acquisition means acquires the data in predetermined recording units and acquires the attributes by associating the attributes with the data in the predetermined recording units; and wherein the attribute recording means records the attributes in the table format which is composed of records each corresponding to one of the predetermined recording units.

3. The information-processing apparatus according to claim 2, further comprising identifier generation means for generating identifiers for distinguishing individual pieces of data recorded in the recording units from each other, wherein the attribute recording means records the attributes in the table format which is composed of records each corresponding to one of the predetermined recording units by associating the attributes in each record with one of the identifiers generated by the identifier generation means.

4. The information-processing apparatus according to claim 3, further comprising:

data supplying means for supplying data to another information-processing apparatus, wherein the acquisition means is capable of acquiring data and an attribute of the data, which are to be recorded onto the recording medium, from the another information-processing apparatus; and the data supplying means is capable of supplying an identifier generated by the identifier generation means to the another information-processing apparatus.

5. An information-processing apparatus for recording data on a recording medium used for sequentially recording data, the information-processing apparatus comprising:

acquisition means for acquiring data to be recorded onto the recording medium and for acquiring an attribute of the data also to be recorded onto the recording medium;

data recording means for recording the data in a first recording area of the recording medium;

attribute recording means for recording the attribute of the data in a second recording area of the recording medium different from the first recording area, the attribute being recorded in a table format associating the attribute with the data;

attribute reading means for reading out the attribute recorded by the attribute recording means;

transmission-request acquisition means for receiving information to be used in a search process to search the recording medium for data from another information-processing apparatus and for receiving a request for transmission of the data found in the search process from the another information-processing apparatus;

search means for carrying out a search operation to search for a record associated with the data associated with the attribute read out by the attribute reading means as an attribute corresponding to the information received by the reproduction-request acquisition means;

computation means for computing statistical information associated with the data by using the attribute included in the record found in the search operation; and statistical-information-transmission control means for controlling transmission of the statistical information to the another information-processing apparatus.

6. An information-processing apparatus for recording data on a recording medium used for sequentially recording data, the information-processing apparatus comprising:

acquisition means for acquiring data to be recorded onto the recording medium and for acquiring an attribute or attributes of the data also to be recorded onto the recording medium;

data recording means for recording the data in a first recording area of the recording medium;

attribute recording means for recording the attribute or attributes of the data in a second recording area of the recording medium different from the first recording area, the attribute or attributes being recorded in a table format associating the attribute or attributes with the data;

a plurality of temporary storage means for temporarily storing data acquired by the acquisition means; and storage control means for controlling an operation to temporarily store the data into the temporary storage means based on the attribute or attributes acquired by the acquisition means, wherein the storage control means is capable of reading out data from a specific one of the temporary storage means whenever the amount of the data is about to exceed the storage capacity of the specific one of the temporary storage means, and the data recording means records the data read out by the storage control means into the recording medium.

* * * * *